US009446305B2

(12) United States Patent
Dietrich, Jr. et al.

(10) Patent No.: US 9,446,305 B2
(45) Date of Patent: Sep. 20, 2016

(54) SYSTEM AND METHOD FOR IMPROVING THE GRAPHICS PERFORMANCE OF HOSTED APPLICATIONS

(75) Inventors: Douglas Sim Dietrich, Jr., Los Gatos, CA (US); Nico Benitez, San Francisco, CA (US); Timothy Cotter, Sunnyvale, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

(21) Appl. No.: 13/430,269

(22) Filed: Mar. 26, 2012

(65) Prior Publication Data

US 2012/0299940 A1   Nov. 29, 2012

Related U.S. Application Data

(63) Continuation-in-part of application No. 12/538,077, filed on Aug. 7, 2009, now Pat. No. 9,138,644, which is a continuation-in-part of application No. 10/315,460, filed on Dec. 10, 2002, now Pat. No. 7,849,491.

(60) Provisional application No. 61/210,888, filed on Mar. 23, 2009.

(51) Int. Cl.
*G06T 1/20* (2006.01)
*A63F 13/30* (2014.01)
(Continued)

(52) U.S. Cl.
CPC ............. *A63F 13/12* (2013.01); *H04H 60/32* (2013.01); *H04L 65/403* (2013.01);
(Continued)

(58) Field of Classification Search
USPC .................................................... 463/40, 42
See application file for complete search history.

(56) References Cited

U.S. PATENT DOCUMENTS

| 4,539,706 A | 9/1985 | Mears et al. |
| 4,573,074 A | 2/1986 | Alaria et al. |

(Continued)

FOREIGN PATENT DOCUMENTS

| EP | 0554586 | 12/1992 |
| EP | 1094642 | 4/2001 |

(Continued)

OTHER PUBLICATIONS

Office Action from U.S. Appl. No. 12/359,171, Sep. 1, 2010, 7 pages.

(Continued)

*Primary Examiner* — Paul A D'Agostino
*Assistant Examiner* — Ankit Doshi
(74) *Attorney, Agent, or Firm* — Martine Penilla Group, LLP

(57) ABSTRACT

A system and method for efficiently processing a video stream using limited hardware and/or software resources. For example, one embodiment of a computer-implemented method for efficiently processing a video stream with a processor pipeline having a plurality of pipeline stages, comprises: identifying a bottleneck stage within the processor pipeline the bottleneck stage processing frames of the video stream; receiving a feedback signal from the bottleneck stage at one or more upstream stages, the feedback signal providing an indication of the speed at which the bottleneck stage is processing the frames of the video stream; and responsively adjusting the speed at which the one or more upstream stages are processing frames of the video stream to approximate the speed at which the bottleneck stage is processing the frames of the video stream.

8 Claims, 13 Drawing Sheets

(51) Int. Cl.

| | | |
|---|---|---|
| *H04N 21/233* | (2011.01) | |
| *H04N 21/2343* | (2011.01) | |
| *H04N 21/2381* | (2011.01) | |
| *H04N 21/478* | (2011.01) | |
| *H04N 21/61* | (2011.01) | |
| *H04N 21/6587* | (2011.01) | |
| *H04H 60/32* | (2008.01) | |
| *H04L 29/06* | (2006.01) | |
| *H04N 21/24* | (2011.01) | |
| *H04N 21/242* | (2011.01) | |
| *H04N 19/61* | (2014.01) | |
| *H04N 19/146* | (2014.01) | |
| *H04N 19/436* | (2014.01) | |
| *H04N 19/169* | (2014.01) | |
| *H04H 20/42* | (2008.01) | |
| *H04N 21/6405* | (2011.01) | |

(52) U.S. Cl.
CPC ........ *H04L 65/4076* (2013.01); *H04L 65/605* (2013.01); *H04L 67/38* (2013.01); *H04N 19/146* (2014.11); *H04N 19/188* (2014.11); *H04N 19/436* (2014.11); *H04N 19/61* (2014.11); *H04N 21/233* (2013.01); *H04N 21/2343* (2013.01); *H04N 21/2381* (2013.01); *H04N 21/242* (2013.01); *H04N 21/2405* (2013.01); *H04N 21/4781* (2013.01); *H04N 21/6125* (2013.01); *H04N 21/6587* (2013.01); *A63F 2300/203* (2013.01); *A63F 2300/402* (2013.01); *A63F 2300/407* (2013.01); *A63F 2300/534* (2013.01); *A63F 2300/538* (2013.01); *A63F 2300/552* (2013.01); *A63F 2300/554* (2013.01); *A63F 2300/5553* (2013.01); *A63F 2300/572* (2013.01); *A63F 2300/577* (2013.01); *A63F 2300/636* (2013.01); *A63F 2300/69* (2013.01); *A63F 2300/8076* (2013.01); *H04H 20/42* (2013.01); *H04N 21/6405* (2013.01)

(56) References Cited

U.S. PATENT DOCUMENTS

| | | | |
|---|---|---|---|
| 4,616,263 A | 10/1986 | Eichelberger | |
| 5,058,199 A | 10/1991 | Grube | |
| 5,129,096 A | 7/1992 | Burns | |
| 5,185,599 A * | 2/1993 | Doornink et al. | 345/548 |
| 5,222,246 A | 6/1993 | Wolkstein | |
| 5,357,604 A | 10/1994 | San et al. | |
| 5,408,679 A | 4/1995 | Masuda | |
| 5,493,644 A | 2/1996 | Thayer et al. | |
| 5,509,028 A | 4/1996 | Marque-Pucheu | |
| 5,558,339 A | 9/1996 | Perlman | |
| 5,586,247 A | 12/1996 | Yoshifuji et al. | |
| 5,586,257 A | 12/1996 | Perlman | |
| 5,599,232 A | 2/1997 | Darling | |
| 5,603,012 A | 2/1997 | Sotheran | |
| 5,608,412 A | 3/1997 | Welles, II et al. | |
| 5,618,045 A | 4/1997 | Kagan et al. | |
| 5,640,386 A | 6/1997 | Wiedeman | |
| 5,642,171 A * | 6/1997 | Baumgartner et al. | 348/515 |
| 5,646,676 A | 7/1997 | Dewkett et al. | |
| 5,654,747 A | 8/1997 | Ottesen et al. | |
| 5,682,204 A | 10/1997 | Uz et al. | |
| 5,710,719 A | 1/1998 | Houle | |
| 5,732,076 A | 3/1998 | Ketseoglou et al. | |
| 5,742,289 A | 4/1998 | Naylor et al. | |
| 5,742,680 A | 4/1998 | Wilson | |
| 5,751,378 A | 5/1998 | Chen et al. | |
| 5,790,176 A | 8/1998 | Craig | |
| 5,815,146 A | 9/1998 | Youden et al. | |
| 5,828,370 A | 10/1998 | Moeller et al. | |
| 5,870,665 A | 2/1999 | Uchikawa | |
| 5,872,575 A | 2/1999 | Segal | |
| 5,884,101 A | 3/1999 | Wu | |
| 5,890,055 A | 3/1999 | Chu et al. | |
| 5,915,020 A | 6/1999 | Tilford et al. | |
| 5,926,208 A | 7/1999 | Noonen et al. | |
| 5,956,088 A | 9/1999 | Shen et al. | |
| 5,959,592 A | 9/1999 | Petruzzelli | |
| 5,974,503 A | 10/1999 | Venkatesh et al. | |
| 5,987,376 A | 11/1999 | Olson et al. | |
| 5,999,808 A | 12/1999 | LaDue | |
| 6,009,060 A | 12/1999 | Kim | |
| 6,052,814 A | 4/2000 | Karasawa | |
| 6,057,847 A * | 5/2000 | Jenkins | 345/422 |
| 6,057,850 A | 5/2000 | Kichury | |
| 6,092,117 A | 7/2000 | Gladwin et al. | |
| 6,110,041 A | 8/2000 | Walker et al. | |
| 6,115,369 A | 9/2000 | Oura | |
| 6,132,306 A | 10/2000 | Trompower | |
| 6,148,142 A | 11/2000 | Anderson | |
| 6,160,993 A | 12/2000 | Wilson | |
| 6,166,703 A | 12/2000 | Muterspaugh | |
| 6,175,854 B1 | 1/2001 | Bretscher | |
| 6,188,571 B1 | 2/2001 | Roganti et al. | |
| 6,205,185 B1 | 3/2001 | Kajiwara | |
| 6,241,612 B1 | 6/2001 | Heredia | |
| 6,263,503 B1 | 7/2001 | Margulis | |
| 6,292,589 B1 | 9/2001 | Chow et al. | |
| 6,292,847 B1 | 9/2001 | Nishimoto et al. | |
| 6,307,567 B1 | 10/2001 | Cohen-Or | |
| 6,323,909 B1 | 11/2001 | Michener et al. | |
| 6,331,856 B1 | 12/2001 | Van Hook et al. | |
| 6,347,216 B1 | 2/2002 | Marko et al. | |
| 6,397,038 B1 | 5/2002 | Green, Sr. et al. | |
| 6,404,775 B1 | 6/2002 | Leslie et al. | |
| 6,409,602 B1 | 6/2002 | Wiltshire et al. | |
| 6,412,112 B1 | 6/2002 | Barrett et al. | |
| 6,414,725 B1 | 7/2002 | Clarin | |
| 6,421,385 B1 | 7/2002 | Uenoyama et al. | |
| 6,424,817 B1 | 7/2002 | Hadden et al. | |
| 6,430,233 B1 | 8/2002 | Dillon et al. | |
| 6,466,248 B1 | 10/2002 | Spann et al. | |
| 6,473,858 B1 | 10/2002 | Shimomura et al. | |
| 6,585,596 B1 | 7/2003 | Leifer et al. | |
| 6,594,313 B1 | 7/2003 | Hazra et al. | |
| 6,597,891 B2 | 7/2003 | Tantawy et al. | |
| 6,600,730 B1 | 7/2003 | Davis et al. | |
| 6,614,768 B1 | 9/2003 | Mahany et al. | |
| 6,631,410 B1 | 10/2003 | Kowalski et al. | |
| 6,650,869 B2 | 11/2003 | Kelly et al. | |
| 6,664,969 B1 | 12/2003 | Emerson et al. | |
| 6,665,872 B1 | 12/2003 | Krishnamurthy et al. | |
| 6,667,944 B2 | 12/2003 | Monden et al. | |
| 6,671,186 B2 | 12/2003 | Kopf | |
| 6,678,502 B1 | 1/2004 | Sugaya et al. | |
| 6,684,058 B1 | 1/2004 | Karacaoglu et al. | |
| 6,690,657 B1 | 2/2004 | Lau et al. | |
| 6,690,726 B1 | 2/2004 | Yavits et al. | |
| 6,690,926 B2 | 2/2004 | Tawil et al. | |
| 6,721,280 B1 | 4/2004 | Mauro et al. | |
| 6,724,826 B1 | 4/2004 | Varian | |
| 6,728,541 B2 | 4/2004 | Ohkura et al. | |
| 6,741,841 B1 | 5/2004 | Mitchell | |
| 6,745,050 B1 | 6/2004 | Forsythe et al. | |
| 6,754,241 B1 | 6/2004 | Krishnamurthy et al. | |
| 6,757,913 B2 | 6/2004 | Knox | |
| 6,760,487 B1 | 7/2004 | Linares | |
| 6,785,262 B1 | 8/2004 | Yao et al. | |
| 6,788,882 B1 | 9/2004 | Geer et al. | |
| 6,792,615 B1 | 9/2004 | Rowe et al. | |
| 6,810,528 B1 | 10/2004 | Chatani | |
| 6,811,113 B1 | 11/2004 | Silansky et al. | |
| 6,820,218 B1 | 11/2004 | Barga et al. | |
| 6,830,515 B2 | 12/2004 | Rowe | |
| 6,832,071 B1 | 12/2004 | Nakamura et al. | |
| 6,836,658 B1 | 12/2004 | Sharon et al. | |
| 6,842,617 B2 | 1/2005 | Williams et al. | |
| 6,845,090 B1 | 1/2005 | Takabatake et al. | |
| 6,850,285 B2 | 2/2005 | Eaton et al. | |

(56) References Cited

U.S. PATENT DOCUMENTS

| | | |
|---|---|---|
| 6,853,197 B1 | 2/2005 | McFarland et al. |
| 6,856,786 B2 | 2/2005 | Belostotsky et al. |
| 6,859,498 B1 | 2/2005 | Choi |
| 6,873,654 B1 | 3/2005 | Rackett |
| 6,886,029 B1 | 4/2005 | Pecus et al. |
| 6,908,390 B2 | 6/2005 | Nguyen et al. |
| 6,925,285 B2 | 8/2005 | Kim |
| 6,947,044 B1 * | 9/2005 | Kulas ............................ 345/473 |
| 6,963,353 B1 | 11/2005 | Firestone |
| 6,968,153 B1 | 11/2005 | Heinonen et al. |
| 6,973,667 B2 | 12/2005 | Fritsch et al. |
| 6,993,353 B2 | 1/2006 | Desai et al. |
| 6,996,742 B2 | 2/2006 | Lerman et al. |
| 7,016,419 B2 | 3/2006 | Tardif |
| 7,028,304 B1 | 4/2006 | Weinberger et al. |
| 7,072,627 B2 | 7/2006 | Coffin, III |
| 7,089,319 B2 | 8/2006 | Lysenko et al. |
| 7,099,388 B2 | 8/2006 | Cooper |
| 7,155,515 B1 | 12/2006 | Brown et al. |
| 7,158,679 B2 | 1/2007 | Sano et al. |
| 7,215,660 B2 | 5/2007 | Perlman |
| 7,219,153 B1 | 5/2007 | Day |
| 7,244,181 B2 | 7/2007 | Wang et al. |
| 7,263,125 B2 | 8/2007 | Lainema |
| 7,272,613 B2 | 9/2007 | Sim et al. |
| 7,289,478 B1 | 10/2007 | Kim et al. |
| 7,295,614 B1 | 11/2007 | Shen et al. |
| 7,299,487 B1 | 11/2007 | Campbell et al. |
| 7,340,764 B2 | 3/2008 | Kubota et al. |
| 7,359,004 B2 | 4/2008 | Yu et al. |
| 7,423,990 B2 | 9/2008 | Kelton et al. |
| 7,430,187 B2 | 9/2008 | Holt et al. |
| 7,461,161 B2 | 12/2008 | Horiguchi |
| 7,471,665 B2 | 12/2008 | Perlman |
| 7,477,688 B1 | 1/2009 | Zhang et al. |
| 7,493,078 B2 | 2/2009 | Perlman |
| 7,502,849 B2 | 3/2009 | Roberts et al. |
| 7,543,326 B2 | 6/2009 | Moni |
| 7,548,657 B2 | 6/2009 | Deaven |
| 7,558,525 B2 | 7/2009 | Perlman |
| 7,567,527 B2 | 7/2009 | Perlman |
| 7,587,520 B1 | 9/2009 | Kent et al. |
| 7,590,084 B2 | 9/2009 | Perlman |
| 7,593,361 B2 | 9/2009 | Perlman |
| 7,680,038 B1 | 3/2010 | Gourlay |
| 7,684,752 B2 | 3/2010 | Perlman |
| 7,702,006 B2 | 4/2010 | Kunii et al. |
| 7,715,336 B2 | 5/2010 | Perlman |
| 7,738,391 B2 | 6/2010 | Melpignano et al. |
| 7,841,946 B2 | 11/2010 | Walker et al. |
| 7,848,409 B2 | 12/2010 | Wang et al. |
| 7,878,908 B2 | 2/2011 | Sloate et al. |
| 7,916,147 B2 | 3/2011 | Clemie et al. |
| 7,936,376 B2 | 5/2011 | Fukuhara |
| 8,147,339 B1 | 4/2012 | Perry |
| 2001/0007575 A1 | 7/2001 | Mori et al. |
| 2001/0024974 A1 | 9/2001 | Cohen |
| 2001/0034743 A1 | 10/2001 | Thomas |
| 2002/0004838 A1 | 1/2002 | Hakenberg |
| 2002/0009149 A1 | 1/2002 | Rodriguez et al. |
| 2002/0015513 A1 | 2/2002 | Ando et al. |
| 2002/0019984 A1 | 2/2002 | Rakib |
| 2002/0028655 A1 | 3/2002 | Rosener et al. |
| 2002/0034980 A1 | 3/2002 | Lemmons et al. |
| 2002/0038459 A1 | 3/2002 | Talmola et al. |
| 2002/0046285 A1 | 4/2002 | Yasushi et al. |
| 2002/0056120 A1 | 5/2002 | McTernan et al. |
| 2002/0059614 A1 | 5/2002 | Lipsanen et al. |
| 2002/0059637 A1 | 5/2002 | Rakib |
| 2002/0061743 A1 | 5/2002 | Hutcheson et al. |
| 2002/0068592 A1 | 6/2002 | Hutcheson et al. |
| 2002/0069265 A1 | 6/2002 | Bountour et al. |
| 2002/0071658 A1 | 6/2002 | Marko et al. |
| 2002/0072329 A1 | 6/2002 | Bandeira et al. |
| 2002/0073429 A1 | 6/2002 | Beane et al. |
| 2002/0075382 A1 | 6/2002 | Cohen |
| 2002/0080267 A1 | 6/2002 | Moluf |
| 2002/0106019 A1 | 8/2002 | Chaddha et al. |
| 2002/0106119 A1 | 8/2002 | Foran et al. |
| 2002/0114330 A1 | 8/2002 | Cheung et al. |
| 2002/0115409 A1 | 8/2002 | Khayrallah |
| 2002/0118758 A1 | 8/2002 | Sekiguchi et al. |
| 2002/0128065 A1 | 9/2002 | Chung et al. |
| 2002/0133491 A1 | 9/2002 | Sim et al. |
| 2002/0149617 A1 | 10/2002 | Becker |
| 2002/0152303 A1 | 10/2002 | Dispensa |
| 2002/0154055 A1 | 10/2002 | Davis et al. |
| 2002/0157115 A1 | 10/2002 | Lu |
| 2002/0165927 A1 | 11/2002 | Theriault et al. |
| 2002/0166119 A1 | 11/2002 | Cristofalo |
| 2002/0170065 A1 | 11/2002 | Pinnick |
| 2002/0181189 A1 | 12/2002 | Yang |
| 2002/0181190 A1 | 12/2002 | Callado |
| 2002/0184303 A1 | 12/2002 | Uner |
| 2002/0184314 A1 | 12/2002 | Riise |
| 2002/0188955 A1 | 12/2002 | Thompson et al. |
| 2003/0009535 A1 | 1/2003 | Apostolopulos |
| 2003/0017846 A1 | 1/2003 | Estevez et al. |
| 2003/0037156 A1 | 2/2003 | Mallart |
| 2003/0048808 A1 | 3/2003 | Stahl et al. |
| 2003/0054827 A1 | 3/2003 | Schmidl et al. |
| 2003/0056168 A1 | 3/2003 | Krishnamachari et al. |
| 2003/0065805 A1 | 4/2003 | Barnes, Jr. |
| 2003/0078103 A1 | 4/2003 | LeMay et al. |
| 2003/0079016 A1 | 4/2003 | Tsao |
| 2003/0124977 A1 | 7/2003 | Smith et al. |
| 2003/0135860 A1 | 7/2003 | Dureau |
| 2003/0139150 A1 | 7/2003 | Rodriguez et al. |
| 2003/0158700 A1 | 8/2003 | Forler et al. |
| 2003/0177187 A1 | 9/2003 | Levine et al. |
| 2003/0181162 A1 | 9/2003 | Matula |
| 2003/0181229 A1 | 9/2003 | Forster et al. |
| 2003/0207684 A1 | 11/2003 | Wesel |
| 2003/0216144 A1 | 11/2003 | Roese et al. |
| 2003/0220072 A1 | 11/2003 | Coffin, III |
| 2003/0226149 A1 | 12/2003 | Chun et al. |
| 2003/0229719 A1 | 12/2003 | Iwata et al. |
| 2003/0234804 A1 | 12/2003 | Parker et al. |
| 2004/0003104 A1 | 1/2004 | Boskovic et al. |
| 2004/0025190 A1 | 2/2004 | McCalla et al. |
| 2004/0034865 A1 | 2/2004 | Barrett et al. |
| 2004/0043819 A1 | 3/2004 | Willis |
| 2004/0048669 A1 | 3/2004 | Rowe |
| 2004/0052371 A1 | 3/2004 | Watanabe |
| 2004/0057516 A1 | 3/2004 | Kim et al. |
| 2004/0064504 A1 | 4/2004 | Domschitz |
| 2004/0080533 A1 | 4/2004 | Nishtala et al. |
| 2004/0093372 A1 | 5/2004 | Chen et al. |
| 2004/0094194 A1 | 5/2004 | Aldoretta et al. |
| 2004/0097288 A1 | 5/2004 | Sloate et al. |
| 2004/0102245 A1 | 5/2004 | Escalera et al. |
| 2004/0110469 A1 | 6/2004 | Judd et al. |
| 2004/0111755 A1 | 6/2004 | Perlman |
| 2004/0114576 A1 | 6/2004 | Itoh et al. |
| 2004/0125820 A1 | 7/2004 | Rios |
| 2004/0153764 A1 | 8/2004 | Paradkar |
| 2004/0153933 A1 | 8/2004 | Ejima et al. |
| 2004/0203694 A1 | 10/2004 | Wong et al. |
| 2004/0204102 A1 | 10/2004 | Kuehnel et al. |
| 2004/0224769 A1 | 11/2004 | Hansen |
| 2005/0047496 A1 | 3/2005 | McIntire et al. |
| 2005/0100100 A1 | 5/2005 | Unger |
| 2005/0104889 A1 | 5/2005 | Clemie et al. |
| 2005/0135480 A1 | 6/2005 | Li et al. |
| 2005/0147164 A1 | 7/2005 | Wu et al. |
| 2005/0183120 A1 | 8/2005 | Jain et al. |
| 2005/0188073 A1 | 8/2005 | Nakamichi et al. |
| 2005/0201460 A1 | 9/2005 | Kang et al. |
| 2005/0286448 A1 | 12/2005 | Proctor et al. |
| 2006/0029065 A1 | 2/2006 | Fellman |
| 2006/0069623 A1 | 3/2006 | MacDonald Korth et al. |
| 2006/0078046 A1 | 4/2006 | Lu |
| 2006/0078051 A1 | 4/2006 | Liang et al. |
| 2006/0098592 A1 | 5/2006 | Proctor, Jr. et al. |

(56) References Cited

U.S. PATENT DOCUMENTS

| | | |
|---|---|---|
| 2006/0111186 A1 | 5/2006 | Hattori |
| 2006/0116208 A1 | 6/2006 | Chen et al. |
| 2006/0117344 A1 | 6/2006 | Lamkin et al. |
| 2006/0117371 A1 | 6/2006 | Margulis |
| 2006/0133513 A1 | 6/2006 | Kounnas ............... 375/240.26 |
| 2006/0136569 A1 | 6/2006 | Tenhunen et al. |
| 2006/0146830 A1 | 7/2006 | Lin et al. |
| 2006/0148571 A1 | 7/2006 | Hossack et al. |
| 2006/0150055 A1 | 7/2006 | Quinard et al. |
| 2006/0154710 A1 | 7/2006 | Serafat |
| 2006/0183421 A1 | 8/2006 | Proctor et al. |
| 2006/0195884 A1 | 8/2006 | van Zoest et al. |
| 2006/0224761 A1 | 10/2006 | Howarth et al. |
| 2006/0230428 A1 | 10/2006 | Craig et al. |
| 2006/0242240 A1 | 10/2006 | Parker et al. |
| 2006/0258463 A1 | 11/2006 | Cugno et al. |
| 2007/0009015 A1 | 1/2007 | Kunii et al. |
| 2007/0009029 A1 | 1/2007 | Craig et al. |
| 2007/0025631 A1 | 2/2007 | Kim et al. |
| 2007/0047901 A1 | 3/2007 | Ando et al. |
| 2007/0058937 A1 | 3/2007 | Ando et al. |
| 2007/0073779 A1 | 3/2007 | Walker et al. |
| 2007/0094700 A1 | 4/2007 | Wolfe |
| 2007/0121629 A1 | 5/2007 | Cuijpers et al. |
| 2007/0147514 A1 | 6/2007 | Yamaguchi et al. |
| 2007/0156815 A1 | 7/2007 | Mate et al. |
| 2007/0165035 A1* | 7/2007 | Duluk et al. ............... 345/506 |
| 2007/0183493 A1 | 8/2007 | Kimpe |
| 2007/0202941 A1 | 8/2007 | Miltenberger et al. |
| 2007/0206673 A1 | 9/2007 | Cipolli et al. |
| 2007/0226364 A1 | 9/2007 | Landspurg |
| 2007/0260492 A1 | 11/2007 | Feied et al. |
| 2007/0260677 A1 | 11/2007 | DeMarco et al. |
| 2007/0271358 A1 | 11/2007 | Gaddy |
| 2007/0297509 A1 | 12/2007 | Mizobuchi et al. |
| 2008/0008276 A1 | 1/2008 | Yokoyama |
| 2008/0025196 A1 | 1/2008 | Karaoguz et al. |
| 2008/0032794 A1 | 2/2008 | Ware et al. |
| 2008/0045338 A1 | 2/2008 | Walker et al. |
| 2008/0207322 A1 | 8/2008 | Mizrahi |
| 2008/0211901 A1 | 9/2008 | Civanlar et al. |
| 2008/0220878 A1 | 9/2008 | Michaelis |
| 2008/0225735 A1 | 9/2008 | Qiu et al. |
| 2008/0247463 A1 | 10/2008 | Buttimer et al. |
| 2008/0268947 A1 | 10/2008 | Fyock et al. |
| 2008/0276269 A1 | 11/2008 | Miller et al. |
| 2008/0298376 A1 | 12/2008 | Takeda et al. |
| 2009/0003452 A1 | 1/2009 | Au et al. |
| 2009/0006736 A1 | 1/2009 | Pantos |
| 2009/0028230 A1 | 1/2009 | Leitner |
| 2009/0109988 A1 | 4/2009 | Musunuri et al. |
| 2009/0144425 A1 | 6/2009 | Marr et al. |
| 2009/0144792 A1 | 6/2009 | Fielibert et al. |
| 2009/0198606 A1 | 8/2009 | Craig et al. |
| 2010/0035691 A1 | 2/2010 | Wild et al. |
| 2010/0064002 A1 | 3/2010 | Levanon et al. |
| 2010/0080292 A1 | 4/2010 | Coulombe |
| 2010/0111410 A1 | 5/2010 | Iu et al. |
| 2010/0124274 A1 | 5/2010 | Cheok et al. ............ 375/240.03 |
| 2010/0150231 A1 | 6/2010 | Huang et al. |
| 2010/0226262 A1 | 9/2010 | Liu et al. |
| 2010/0248843 A1 | 9/2010 | Karsten |
| 2010/0250770 A1 | 9/2010 | Barreto et al. |
| 2011/0039612 A1 | 2/2011 | Pececnik |
| 2011/0157197 A1 | 6/2011 | Clemie et al. |
| 2011/0228845 A1 | 9/2011 | Banerjee |
| 2012/0075317 A1 | 3/2012 | Clemie et al. |
| 2012/0198510 A1 | 8/2012 | Stoneback |

FOREIGN PATENT DOCUMENTS

| | | |
|---|---|---|
| EP | 1104686 | 6/2001 |
| EP | 1130920 | 9/2001 |
| EP | 1202472 | 5/2002 |
| EP | 1837060 | 9/2007 |
| IL | 96-11928 | 12/2006 |
| JP | 09-212661 | 8/1997 |
| JP | 2001111575 | 4/2001 |
| JP | 2001244864 | 9/2001 |
| KR | 20020092022 | 12/2002 |
| WO | WO-9641479 | 12/1996 |
| WO | WO-97/42766 | 11/1997 |
| WO | WO-0050971 | 8/2000 |
| WO | WO-0141447 | 6/2001 |
| WO | WO-02/060183 | 8/2002 |
| WO | WO-02078369 | 10/2002 |
| WO | WO-03032666 | 4/2003 |
| WO | WO-03/047710 | 6/2003 |
| WO | WO-03/075116 | 9/2003 |
| WO | WO-2006134055 | 12/2006 |
| WO | WO-2007130012 | 11/2007 |
| WO | WO-2010/141492 | 12/2010 |
| WO | WO-2010141522 | 12/2010 |

OTHER PUBLICATIONS

Office Action from U.S. Appl. No. 12/538,086, mailed Oct. 7, 2010, 10 pages.

Office Action from U.S. Appl. No. 12/538,076 mailed Oct. 12, 2011, 7 pages.

Office Action from U.S. Appl. No. 12/359,229, mailed Oct. 26, 2011. 8 pages.

Office Action from U.S. Appl. No. 12/359,218, mailed Sep. 13, 2011. 9 pages.

Office Action from U.S. Appl. No. 12/538,090, mailed Jan. 26, 2012, 12 pages.

Final Office Action from U.S. Appl. No. 12/359,154 mailed Dec. 13, 2011, 13 pages.

Office Action from U.S. Appl. No. 12/359,154 mailed Apr. 11, 2011, 7 pages.

Office Action from U.S. Appl. No. 12/359,127, mailed Mar. 6, 2012, 6 pages.

Office Action from U.S. Appl. No. 12/359,140, mailed Mar. 29, 2011. 6 pages.

Final Office Action from U.S. Appl. No. 12/359,171, mailed May 9, 2011, 18 pages.

Office Action from U.S. Appl. No. 12/359,187, mailed Mar. 29, 2011. 7 pages.

Final Office Action from U.S. Appl. No. 12/359,187, mailed Feb. 14, 2012. 9 pages.

Office Action from U.S. Appl. No. 12/538,077 mailed Aug. 12, 2011, 7 pages.

Office Action from U.S. Appl. No. 12/359,226, mailed Apr. 3, 2012, 7 pages.

Office Action from U.S. Appl. No. 12/359,227, mailed Apr. 10, 2012, 6 pages.

Office Action from U.S. Appl. No. 12/359,150, mailed Mar. 23, 2012, 12 pages.

Final Office Action from U.S. Appl. No. 12/359,140, mailed Mar. 20, 2012, 13 pages.

Office Action from U.S. Appl. No. 12/538,041, mailed Mar. 19, 2012, 9 pages.

Office Action from U.S. Appl. No. 12/359,233, mailed Apr. 20, 2012, 8 pages.

Office Action from U.S. Appl. No. 12/538,054, mailed Jan. 18, 2012, 12 pages.

Office Action from U.S. Appl. No. 12/538,062, mailed May 10, 2012, 13 pages.

Office Action from U.S. Appl. No. 12/538,096, mailed Jun. 26, 2012, 13 pages.

Office Action from U.S. Appl. No. 12/359,218, mailed Jun. 25, 2012, 26 pages.

Office Action from U.S. Appl. No. 12/538,076, mailed Jun. 25, 2012, 21 pages.

Final Office Action from U.S. Appl. No. 12/359,229, mailed Oct. 5, 2012, 2011, 15 pages.

Final Office Action from U.S. Appl. No. 12/538,054, mailed Aug. 24, 21 pages.

(56) References Cited

OTHER PUBLICATIONS

Notice of Allowance from U.S. Appl. No. 12/538,041, mailed Sep. 19, 2012, 17 pages.
Notice of Allowance from U.S. Appl. No. 12/359,154 mailed Aug. 28, 2012, 28 pages.
Final Office Action from U.S. Appl. No. 12/538,090, mailed Dec. 4, 2012, 22 pages.
Final Office Action from U.S. Appl. No. 12/359,127, mailed Jan. 9, 2013, 30 pages.
Final Office Action from U.S. Appl. No. 12/359,227, mailed Dec. 11, 2012, 18 pages.
Final Office Action from U.S. Appl. No. 12/359,233, mailed Jan. 28, 2013, 31 pages.
Notice of Allowance from U.S. Appl. No. 12/538,096, mailed Dec. 13, 2012, 18 pages.
Final Office Action from U.S. Appl. No. 12/538,077, mailed Jun. 19, 2013, 19 pages.
Notification of Transmittal of the International Search Report and the Written Opinion of the International Searching Authority, or the Declaration for foreign counterpart PCT Application No. PCT/US13/33744 mailed Sep. 30, 2013, 12 pages.
Office Action from U.S. Appl. No. 12/538,077, mailed Mar. 25, 2014, 33 pages.
"Accelerated Graphics Port Interfaces Specification", Intel Corporation, Revision 1.0, Jul. 31, 1996, 161 pages.
"IP Multicast Technical Overview", Cisco Systems, Aug. 2007., 9.
Boulware, Jack , "Power Houses", "Wired", Nov. 2002, Issue 10.11, Wired Digital, Inc., 8 pages, (Nov. 2002).
Bronez, Thomas , et al., "Shipboard experiments for a multishop 802.11 communications system—RF channel characterization and MAC performance measurement", Military Communications Conference, 2005. MILCOM 2005. IEEE. The MITRE Corporation Mclean, VA., (2005), 7 pages.
Bungie, "HALO 3 How-to: Saved Films, New ViDOC", http://www.bungie.net/News/content.aspx?type=topnews&link=h3savedfilms, Sep. 20, 2007, pp. 1-8.
Dickinson, Patrick, "Instant Replay: Building a Game Engine with Reproducible Behavior", http://www.gamasutra.com/view/feature/3057/instant_replay_building_a_game.php?print, pp. 1-6.
Duong, Ta Nguyen Binh, "A Dynamic Load Sharing Algorithm for Massively Multiplayer Online Games:", IEEE, 2003, pp. 131-136.
Everitt, C., "Projective Texture Mapping" nVidia white paper last updated Apr. 24, 2001, 7 pages.

Frauenfelder, M., "G-Cluster Makes Games to Go", The Feature: It's All About the Mobile Internet, http://www.thefeaturearchives.com/13267.html, 3 pages, 2001.
IDS and characterization of references submitted by Inventor in related applications, 7 pages, May 24, 2013.
Laulajainen, J., et al., "Experiments with QOS-Aware Gaming-on-Demand Service" Advanced Information Networking and Applications, 2006, vol. 1, Apr. 18, 2006, pp. 805-810, XP010915314, DOI: 10.1109/AINA.2006.175, ISBN: 978-0-7695-2466-5.
Jarvinen, S., et al., "QoS-Aware real-time video encoding How to Improve the User Experience of a Gaming-on-Demand Service", Consumer Communications and Networking Conference, vol. 2, Jan. 8, 2006, pp. 994-997, XP010893324, DOI: 10.1109/CCNC.2006.1593.
Kubota, Shuji, "High-Quality Frame-Synchronization for Satellite Video Signal Transmission", IEEE Transactions on Aerospace and Electronic Systems, vol. 31, No. 1, Jan. 1995, pp. 430-440.
Levoy, M., "Polygon-Assisted JPEG and MPEG Compression of Synthetic Images", Computer and Graphics Proceedings, Los Angeles, Aug. 6-11, 1995, Computer Graphics Proceedings (SIGGRAPH), New York, IEEE, US., pp. 21-28.
Nguyen, Cong Duc, "Optimal Assignment of Distributed Servers to Virtual Partitions for the Provision of Immersive Voice Communication in Massively Multiplayer Games", Computer Communications 29 2006, available online Nov. 15, 2005, pp. 1260-1270.
Perry, David , U.S. Appl. No. 61/014,036, filed Dec. 15, 2007, entitled, "Systems and Methods of Serving Game Video", 39 pages.
Yoon, et al., "Web Based remote rendering with IBRAC (Image-based rendering acceleration and compression)", European Association for Computer Graphics, 21 Annual Conference, Eurographics, Interlaken, Switzerlmand, Aug. 21-25, 2000, 10 pages.
Wallach, D., et al., "Accelerated MPEG Compression of Dynamic Polygonal Scens", computer Graphics Proceedings, Annual Conference Series, SIGGRAPH, Jul. 24, 1994, pp. 193-196.
Wu, Dapeng, "Transporting Real-time Video over the Internet: Challenges and Approaches", Proceedings of the IEEE, vol. 88, No. 12, Dec. 2000, pp. 1-18.
International Preliminary Report on Patentability for International Application No. PCT/US2013/033744, mailed Oct. 9, 2014, 7 pages.
Taiwan App. No. 102110747, Search Report, Feb. 18, 2016.
Sheaffer, et al., "*A Flexible Simulation Framework for Graphics Architectures*", HWWS '04 Proc of the ACM Siggraph/Eurographics Conf., The Eurographics Assn. 2004.

\* cited by examiner

SYSTEM AND METHOD FOR IMPROVING THE GRAPHICS PERFORMANCE OF HOSTED APPLICATIONS

This application is a continuation-in-part of U.S. patent application Ser. No. 12/538,077, filed Aug. 7, 2009, now U.S. Pat. No. 9,138,644 entitled SYSTEM AND METHOD FOR ACCELERATED MACHINE SWITCHING, which claims priority to U.S. Provisional Application Ser. No. 61/210,888, filed, Mar. 23, 2009, and is a continuation-in-part (CIP) application of Ser. No. 10/315,460 filed Dec. 10, 2002 now U.S. Pat. No. 7,849,491 entitled, "APPARATUS AND METHOD FOR WIRELESS VIDEO GAMING", which is assigned to the assignee of the present CIP application.

TECHNICAL FIELD

The present disclosure relates generally to the field of data processing systems and particularly to a system and method for improving the graphics performance of hosted applications.

BACKGROUND

For low latency applications such as video games, it is critical that graphics operations proceed as efficiently as possible. However, attempts to speed the graphics rendering process may result in undesirable visual artifacts such as "tearing" in which information from two or more different frames is shown on a display device in a single screen draw. The embodiments of the invention described below provide a variety of techniques for improving the efficiency of graphics rendering while at the same time reducing these undesirable visual artifacts.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

DESCRIPTION OF EXAMPLE EMBODIMENTS

In the following description specific details are set forth, such as device types, system configurations, communication methods, etc., in order to provide a thorough understanding of the present disclosure. However, persons having ordinary skill in the relevant arts will appreciate that these specific details may not be needed to practice the embodiments described.

The assignee of the present application has developed an online video gaming and application hosting system. Certain embodiments of this system are described, for example, in U.S. patent application Ser. No. 12/538,077, filed Aug. 7, 2009, entitled SYSTEM AND METHOD FOR ACCELERATED MACHINE SWITCHING (hereinafter '077 application) which claims priority to U.S. Provisional Application Ser. No. 61/210,888, filed, Mar. 23, 2009, and is a continuation-in-part (CIP) application of Ser. No. 10/315,460 filed Dec. 10, 2002 entitled, "APPARATUS AND METHOD FOR WIRELESS VIDEO GAMING", which is assigned to the assignee of the present CIP application. These applications are sometimes referred to as the "co-pending applications" and are incorporated herein by reference. A brief description of certain pertinent aspects of the online video game and application hosting system described in the co-pending applications will now be provided, following by a detailed description of a virtualization and encryption system and method for hosting applications.

An Exemplary Online Video Game and Application Hosting System

Figure 1:
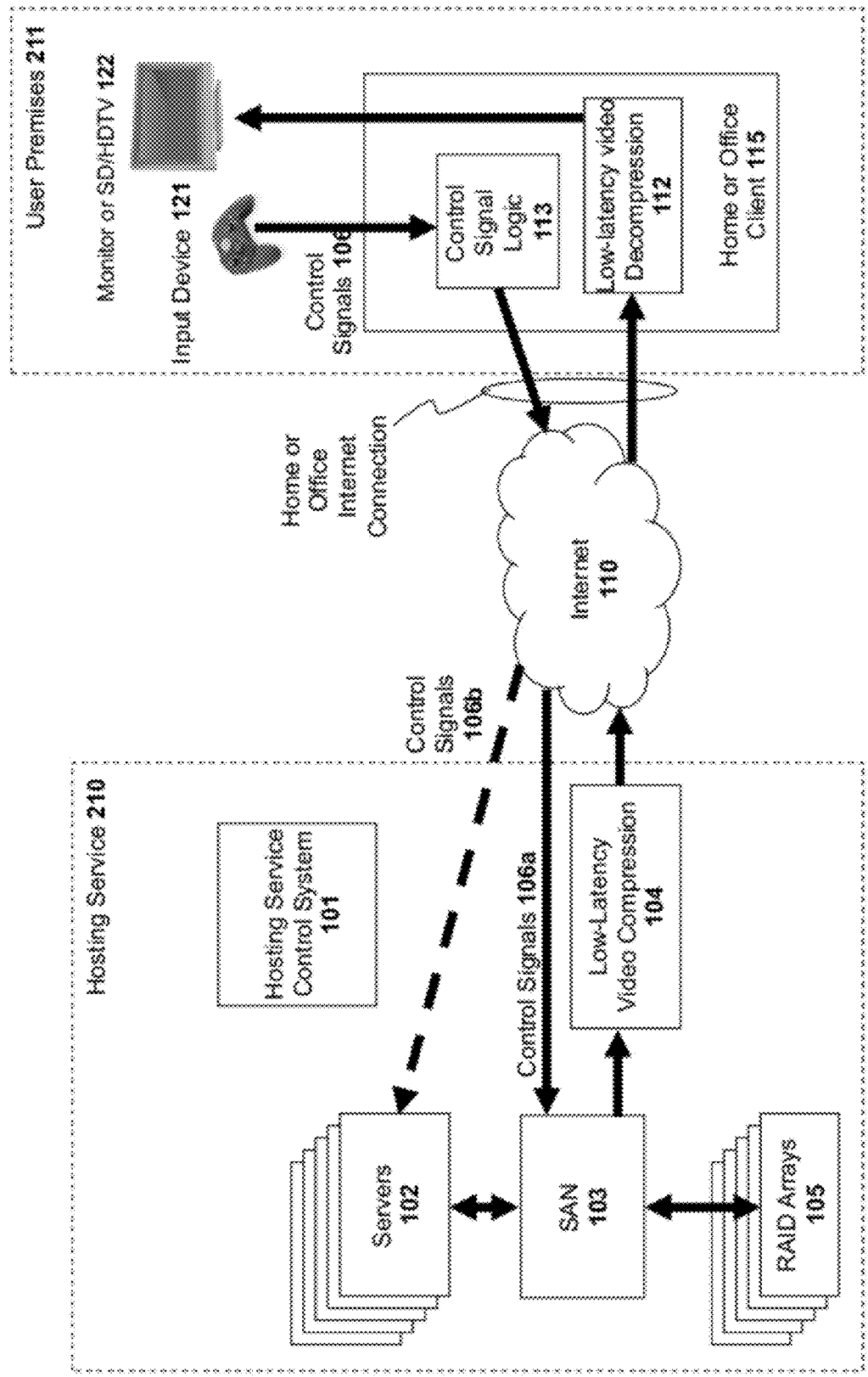
FIG. 1 illustrates a system architecture for executing online video games according to one embodiment of the invention.

FIG. 1 illustrates one embodiment of a video game/application hosting service 210 described in the co-pending applications. The Hosting Service 210 hosts applications running on Servers 102, that accept input from an Input device 121 received by Home or Office Client 115, and sent through the Internet 110 to the Hosting Service 210. The Servers 102 are responsive to the input, and update their video and audio output accordingly which is compressed through Low-Latency Video Compression 104. The compressed video is then streamed through the Internet 110 to be decompressed by the Home or Office Client 115, and then displayed on a monitor or SD/HDTV 122. This system is a low-latency streaming interactive video system as more thoroughly described in the aforementioned "co-pending applications."

Figure 2:
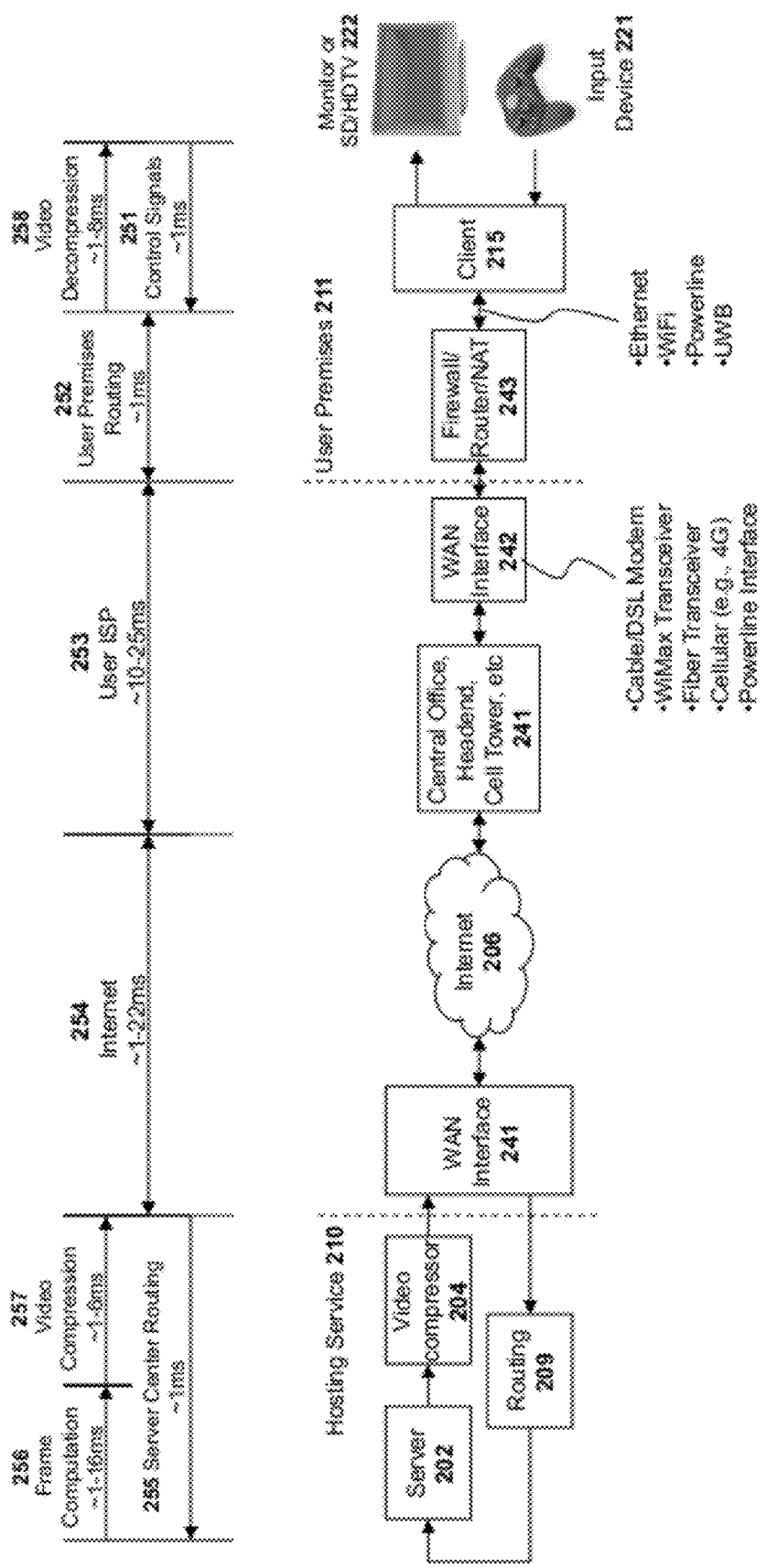
FIG. 2 illustrates different communication channels over which an online video game may be played in accordance with one embodiment of the invention.

As shown in FIG. 2, the network connection between the Hosting Service 210 and Home and Office Client 215 may be implemented through a wide range of network technologies, of varying degrees of reliability, such as wired or optical fiber technologies that are typically more reliable and wireless technologies that may be subject to unpredictable interference or range limitations (e.g. Wi-Fi) and are typically less reliable. Any of these client devices may have their own user input devices (e.g., keyboards, buttons, touch screens, track pads or inertial-sensing wands, video capture cameras and/or motion-tracking cameras, etc.), or they may use external input devices 221 (e.g., keyboards, mice, game controllers, inertial sensing wand, video capture cameras and/or motion tracking cameras, etc.), connected with wires or wirelessly. As described in greater detail below, the hosting service 210 includes servers of various levels of performance, including those with high-powered CPU/GPU processing capabilities. During playing of a game or use of an application on the hosting service 210, a home or office client device 215 receives keyboard and/or controller input from the user, and then it transmits the controller input through the Internet 206 to the hosting service 210 that executes the gaming program code in response and generates successive frames of video output (a sequence of video images) for the game or application software (e.g., if the user presses a button which would direct a character on the screen to move to the right, the game program would then create a sequence of video images showing the character moving to the right). This sequence of video images is then compressed using a low-latency video compressor, and the hosting service 210 then transmits the low-latency video stream through the Internet 206. The home or office client device then decodes the compressed video stream and renders the decompressed video images on a monitor or TV. Consequently, the computing and graphical hardware requirements of the client device 215 are significantly reduced. The client 215 only needs to have the processing power to forward the keyboard/controller input to the Internet 206 and decode and decompress a compressed video stream received from the Internet 206, which virtually any personal computer is capable of doing today in software on its CPU (e.g., a Intel Corporation Core Duo CPU running at approximately 2 GHz is capable of decompressing 720p HDTV encoded using compressors such as H.264 and Windows Media VC9). And, in the case of any client devices, dedicated chips can also perform video decompression for such standards in real-time at far lower cost and with far less power consumption than a general-purpose CPU such as would be required for a modern PC. Notably, to perform the function of forwarding controller input and decompressing video, home client devices 205 do not require any specialized graphics processing units (GP Us), optical drive or hard drives.

As games and applications software become more complex and more photo-realistic, they will require higher-performance CPUs, GPUs, more RAM, and larger and faster disk drives, and the computing power at the hosting service 210 may be continually upgraded, but the end user will not be required to update the home or office client platform 215 since its processing requirements will remain constant for a display resolution and frame rate with a given video decompression algorithm. Thus, the hardware limitations and compatibility issues seen today do not exist in the illustrated system.

Further, because the game and application software executes only in servers in the hosting service 210, there never is a copy of the game or application software (either in the form of optical media, or as downloaded software) in the user's home or office ("office" as used herein unless otherwise qualified shall include any non-residential setting, including, schoolrooms, for example). This significantly mitigates the likelihood of a game or application software being illegally copied (pirated), as well as mitigating the likelihood of a valuable database that might be use by a game or applications software being pirated, exploited or otherwise compromised. Indeed, if specialized servers are required (e.g., requiring very expensive, large or noisy equipment) to play the game or application software that are not practical for home or office use, then even if a pirated copy of the game or application software were obtained, it would not be operable in the home or office.

Figure 3:
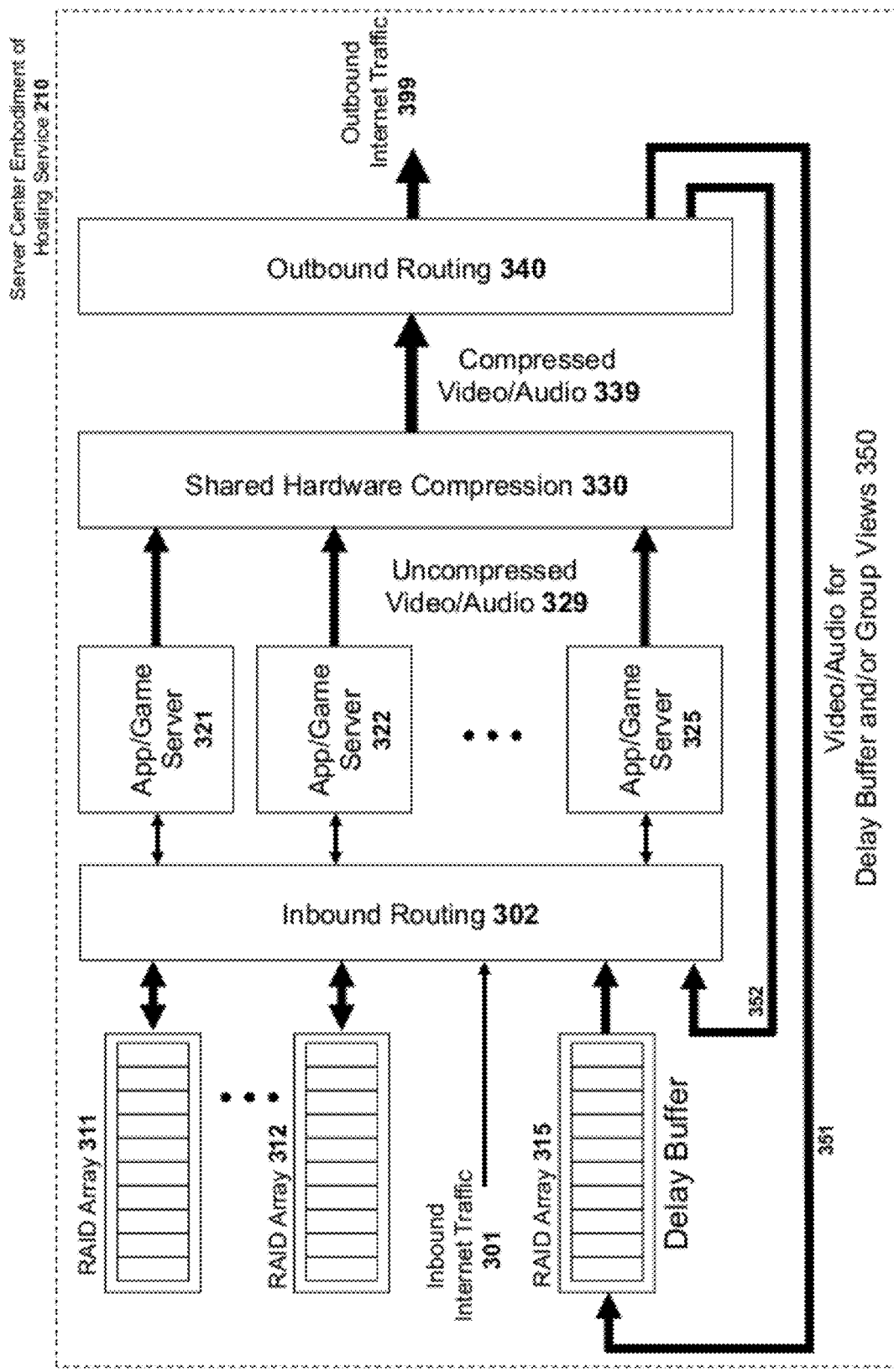
FIG. 3 illustrates one embodiment of a system architecture for compressing audio/video generated by a video game.

FIG. 3 illustrates an embodiment of components of a server center for hosting service 210 utilized in the following feature descriptions. As with the hosting service 210 illustrated in FIGS. 1-2, the components of this server center are controlled and coordinated by a hosting service 210 control system 101 unless otherwise qualified.

Inbound internet traffic 301 from user clients 215 is directed to inbound routing 302. Typically, inbound internet traffic 301 will enter the server center via a high-speed fiber optic connection to the Internet, but any network connection means of adequate bandwidth, reliability and low latency will suffice. Inbound routing 302 is a system of network (the network can be implemented as an Ethernet network, a fiber channel network, or through any other transport means) switches and routing servers supporting the switches which takes the arriving packets and routes each packet to the appropriate application/game ("app/game") server 321-325. In one embodiment, a packet which is delivered to a particular app/game server represents a subset of the data received from the client and/or may be translated/changed by other components (e.g., networking components such as gateways and routers) within the data center. In some cases, packets will be routed to more than one server 321-325 at a time, for example, if a game or application is running on multiple servers at once in parallel. RAID arrays 311-312 are connected to the inbound routing network 302, such that the app/game servers 321-325 can read and write to the RAID arrays 311-312. Further, a RAID array 315 (which may be implemented as multiple RAID arrays) is also connected to the inbound routing 302 and data from RAID array 315 can be read from app/game servers 321-325. The inbound routing 302 may be implemented in a wide range of prior art network architectures, including a tree structure of switches, with the inbound internet traffic 301 at its root; in a mesh structure interconnecting all of the various devices; or as an interconnected series of subnets, with concentrated traffic amongst intercommunicating device segregated from concentrated traffic amongst other devices. One type of network configuration is a SAN which, although typically used for storage devices, it can also be used for general high-speed data transfer among devices. Also, the app/game servers 321-325 may each have multiple network connections to the inbound routing 302. For example, a server 321-325 may have a network connection to a subnet attached to RAID Arrays 311-312 and another network connection to a subnet attached to other devices.

The app/game servers 321-325 may all be configured the same, some differently, or all differently, as previously described. In one embodiment, each user, when using the hosting service is typically using at least one app/game server 321-325. For the sake of simplicity of explanation, we shall assume a given user is using app/game server 321, but multiple servers could be used by one user, and multiple users could share a single app/game server 321-325. The user's control input, sent from client 215 as previously described is received as inbound Internet traffic 301, and is routed through inbound routing 302 to app/game server 321. App/game server 321 uses the user's control input as control input to the game or application running on the server, and computes the next frame of video and the audio associated with it. App/game server 321 then outputs the uncompressed video/audio 329 to shared video compression 330. App/game server may output the uncompressed video via any means, including one or more Gigabit Ethernet connections, but in one embodiment the video is output via a DVI connection and the audio and other compression and communication channel state information is output via a Universal Serial Bus (USB) connection.

The shared video compression 330 compresses the uncompressed video and audio from the app/game servers 321-325. The compression maybe implemented entirely in hardware, or in hardware running software. There may a dedicated compressor for each app/game server 321-325, or if the compressors are fast enough, a given compressor can be used to compress the video/audio from more than one app/game server 321-325. For example, at 60 fps a video frame time is 16.67 ms. If a compressor is able to compress a frame in 1 ms, then that compressor could be used to compress the video/audio from as many as 16 app/game servers 321-325 by taking input from one server after another, with the compressor saving the state of each video/audio compression process and switching context as it cycles amongst the video/audio streams from the servers. This results in substantial cost savings in compression hardware. Since different servers will be completing frames at different times, in one embodiment, the compressor resources are in a shared pool 330 with shared storage means (e.g., RAM, Flash) for storing the state of each compression process, and when a server 321-325 frame is complete and ready to be compressed, a control means determines which compression resource is available at that time, provides the compression resource with the state of the server's compression process and the frame of uncompressed video/audio to compress.

Note that part of the state for each server's compression process includes information about the compression itself, such as the previous frame's decompressed frame buffer data which may be used as a reference for P tiles, the resolution of the video output; the quality of the compression; the tiling structure; the allocation of bits per tiles; the compression quality, the audio format (e.g., stereo, surround sound, Dolby® AC-3). But the compression process state also includes communication channel state information regarding the peak data rate and whether a previous frame is currently being output (and as result the current frame should be ignored), and potentially whether there are channel characteristics which should be considered in the compression, such as excessive packet loss, which affect decisions for the compression (e.g., in terms of the frequency of I tiles, etc). As the peak data rate or other channel characteristics change over time, as determined by an app/game server 321-325 supporting each user monitoring data sent from the client 215, the app/game server 321-325 sends the relevant information to the shared hardware compression 330. These and other features of the hosting service 210 are described in detail the co-pending applications.

The shared hardware compression 330 also packetizes the compressed video/audio using means such as those previously described, and if appropriate, applying FEC codes, duplicating certain data, or taking other steps to as to adequately ensure the ability of the video/audio data stream to be received by the client 215 and decompressed with as high a quality and reliability as feasible.

Some applications, such as those described below, require the video/audio output of a given app/game server 321-325 to be available at multiple resolutions (or in other multiple formats) simultaneously. If the app/game server 321-325 so notifies the shared hardware compression 330 resource, then the uncompressed video/audio 329 of that app/game server 321-325 will be simultaneously compressed in different formats, different resolutions, and/or in different packet/error correction structures. In some cases, some compression resources can be shared amongst multiple compression processes compressing the same video/audio (e.g., in many compression algorithms, there is a step whereby the image is scaled to multiple sizes before applying compression. If different size images are required to be output, then this step can be used to serve several compression processes at once). In other cases, separate compression resources will be required for each format. In any case, the compressed video/audio 339 of all of the various resolutions and formats required for a given app/game server 321-325 (be it one or many) will be output at once to outbound routing 340. In one embodiment the output of the compressed video/audio 339 is in UDP format, so it is a unidirectional stream of packets.

The outbound routing network 340 comprises a series of routing servers and switches which direct each compressed video/audio stream to the intended user(s) or other destinations through outbound Internet traffic 399 interface (which typically would connect to a fiber interface to the Internet) and/or back to the delay buffer 315 (implemented as a RAID array in one embodiment), and/or back to the inbound routing 302, and/or out through a private network (not shown) for video distribution. Note that (as described below) the outbound routing 340 may output a given video/audio stream to multiple destinations at once. In one embodiment this is implemented using Internet Protocol (IP) multicast in which a given UDP stream intended to be streamed to multiple destinations at once is broadcasted, and the broadcast is repeated by the routing servers and switches in the outbound routing 340. The multiple destinations of the broadcast may be to multiple users' clients via the Internet, to multiple app/game servers 321-325 via inbound routing 302, and/or to one or more delay buffers 315. Thus, the output of a given server 321-322 is compressed into one or multiple formats, and each compressed stream is directed to one or multiple destinations.

Further, in another embodiment, if multiple app/game servers 321-325 are used simultaneously by one user (e.g., in a parallel processing configuration to create the 3D output of a complex scene) and each server is producing part of the resulting image, the video output of multiple servers 321-325 can be combined by the shared hardware compression 330 into a combined frame, and from that point forward it is handled as described above as if it came from a single app/game server 321-325.

Note that in one embodiment, a copy (in at least the resolution or higher of video viewed by the user) of all video generated by app/game servers 321-325 is recorded in delay buffer 315 for at least some number of minutes (15 minutes in one embodiment). This allows each user to "rewind" the video from each session in order to review previous work or exploits (in the case of a game). Thus, in one embodiment, each compressed video/audio output 339 stream being routed to a user client 215 is also being multicasted to a delay buffer 315. When the video/audio is stored on a delay buffer 315, a directory on the delay buffer 315 provides a cross reference between the network address of the app/game server 321-325 that is the source of the delayed video/audio and the location on the delay buffer 315 where the delayed video/audio can be found.

Graphics Processing in One Embodiment of an Online Game System

For low latency applications such as video games, it is critical that graphics operations proceed as efficiently as possible. However, attempts to speed the graphics rendering process may result in undesirable visual artifacts such as "tearing" in which information from two or more different frames is shown on a display device in a single screen draw. The embodiments of the invention described below provide a variety of techniques for improving the efficiency of graphics rendering while at the same time reducing these undesirable visual artifacts.

Figure 4:
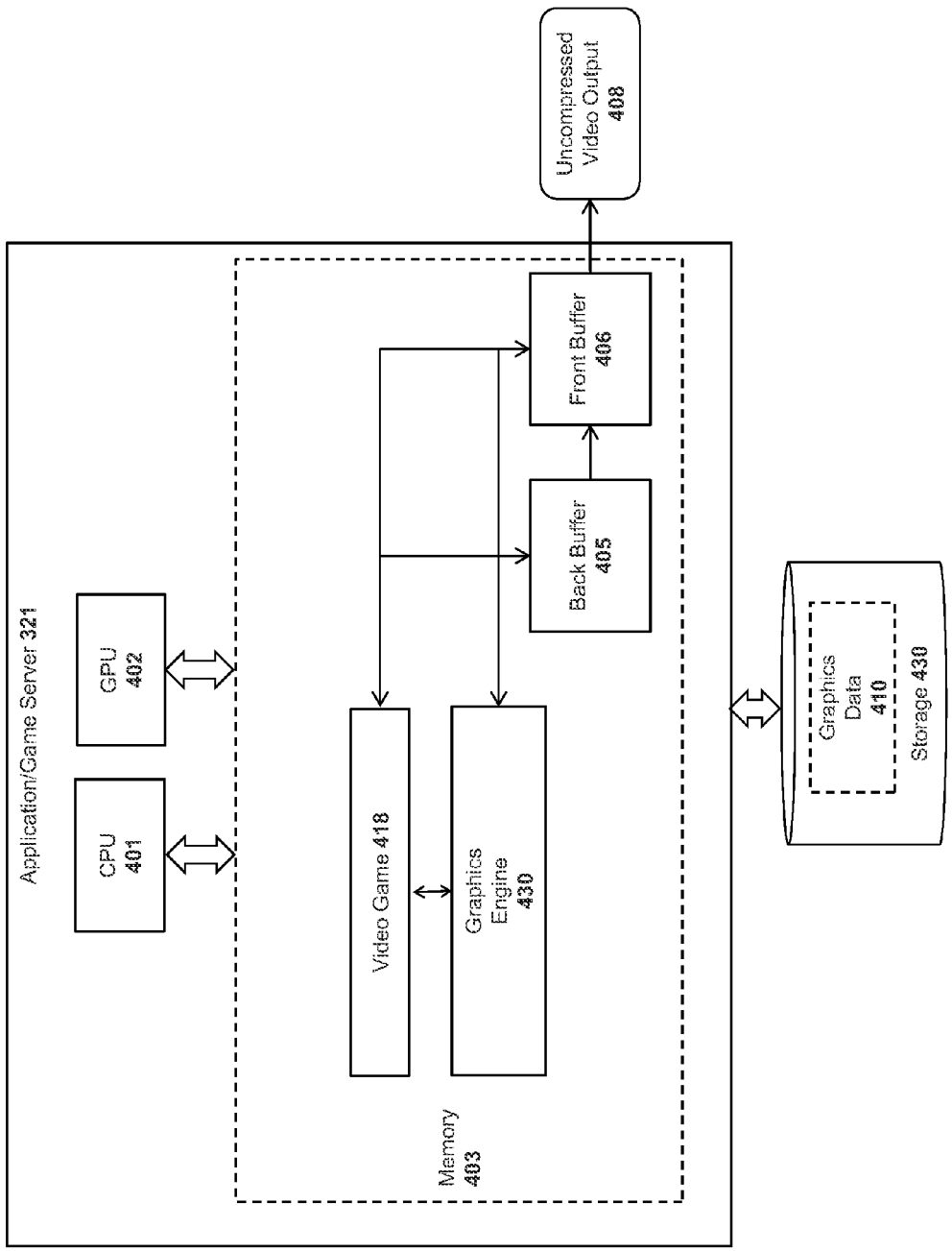
FIG. 4 illustrates a system architecture according to one embodiment of the invention.

As illustrated in FIG. 4, in one embodiment, each application/game server 321 is equipped with a central processing unit (CPU) 401 for executing video game program code 418 stored in memory 403 and a graphics processing unit (GPU) for executing graphics commands to render the video game output 408. The architectures of the CPU and GPU are well known and, as such, a detailed description of these units and the instructions/commands executed by these units will not be provided herein. Briefly, the GPU is capable of processing a library of graphics commands as specified by one or more graphics application programming interfaces (APIs) such as Open GL or Direct 3D. The program code for executing these graphics APIs is represented in FIG. 4 as graphics engine 430. As the CPU processes the video game program code 418 it hands off graphics commands specified by the API to the GPU which executes the commands and generates the video output 408. It should be noted, however, that the underling principles of the invention are not limited to any particular graphics standard.

In one embodiment, both the CPU and GPU are pipelined processors, meaning that a set of data processing stages are connected in series within the CPU and GPU, so that the output of one stage is the input of the next one. By way of example, the CPU pipeline typically includes an instruction fetch stage, an instruction decode stage, an execution stage and a retirement stage, each of which may have multiple sub-stages. A GPU pipeline may have many more stages including, by way of example and not limitation, transformation, vertex lighting, viewing transformation, primitive generation, project transformation, clipping, viewport transformation, rasterization, texturing, fragment shading and display. These pipeline stages are well understood by one of ordinary skill in the art and will not be described in detail herein. The elements of a pipeline are often executed in parallel or in time-sliced fashion and some amount of queuing storage is often required between stages of the pipeline.

Each of the above stages and the queuing required between the stages adds a certain amount of latency to the execution of graphics commands. The embodiments of the invention below provide techniques for minimizing this latency. Reducing latency is important because it expands the markets in which a device can be used. Moreover, the manufacturer of a device may not have control over significant sources of latency. For example, a user may attach a high latency television to a video game console or a multimedia device may be used remotely (e.g., online video games, a medical device controlled over the internet or military devices engaging targets on the front line while the operator remains safely behind the lines).

As illustrated in FIG. 4, one embodiment of the invention includes a back buffer 405 and a front buffer 406 for storing video game image frames generated by the graphics engine 430 as the user plays a video game. Each "frame" is comprised of a set of pixel data representing one screen image of the video game. In operation, each frame is created in the back buffer as graphics commands are executed using graphics data. When a frame has been completed in the back buffer, it is transferred to the front buffer 406 from where it is scanned out line by line to create the uncompressed video output 408. The scan-out process may occur at a predetermined standard frequency (e.g., such as 60 Hz or 120 Hz as implemented on standard CRT or LCD monitors). The uncompressed video output 408 may then be compressed using the various advanced low latency video compression techniques described in the co-pending applications. Of course, the frame buffer doesn't need to be scanned out of the video card (e.g., via a digital video interface (DVI)) as implied above. It may be transferred directly to the compression hardware, for example over the application server's internal bus (e.g., a PCI Express bus). The frame buffer may be copied in memory either by one of the CPUs or GPUs. The compression hardware may be (by way of example and not limitation) the CPU, the GPU, hardware installed in the server, and/or hardware on the GPU card.

Figure 5:
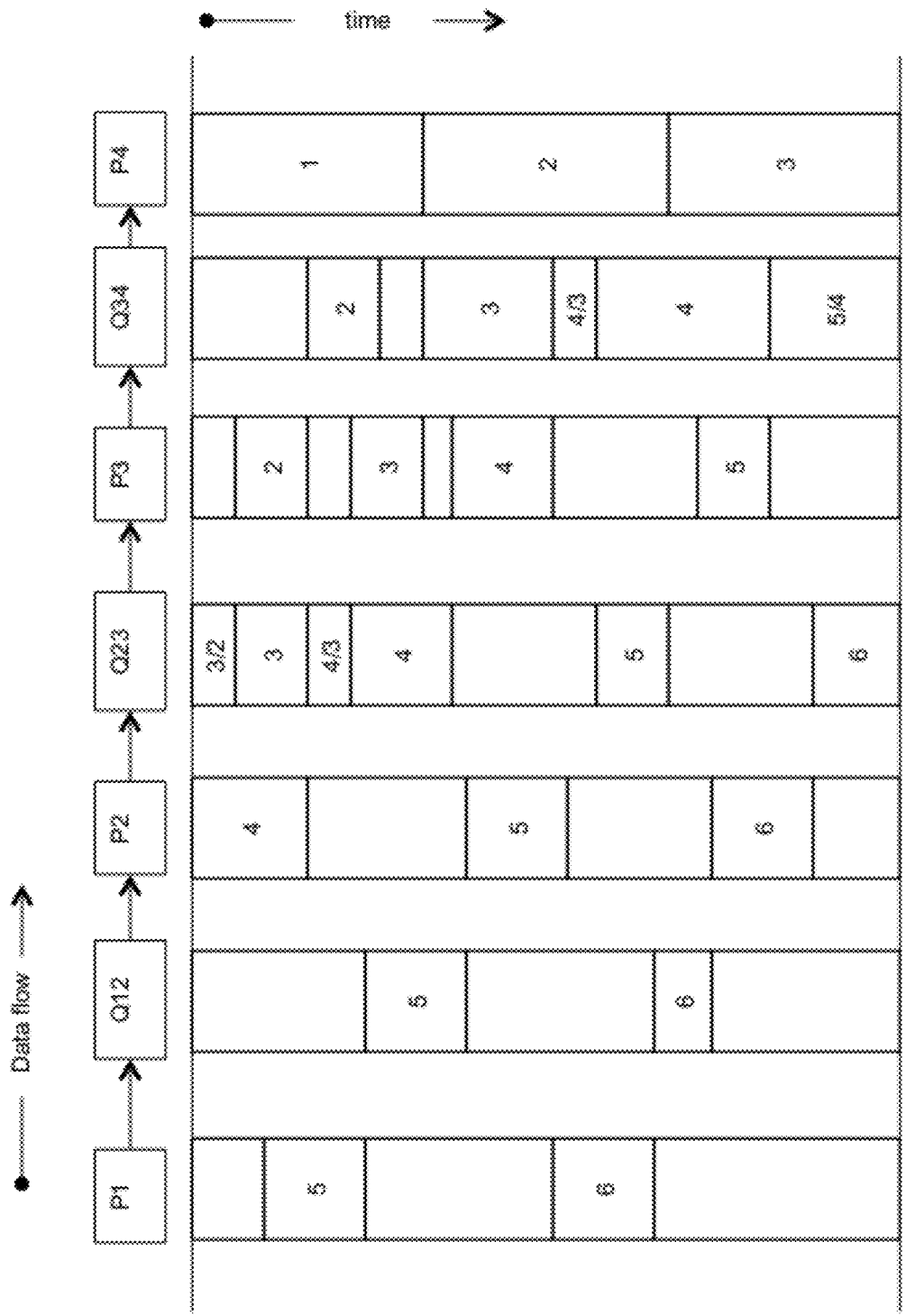
FIGS. 5-12 illustrate data flow between various system components and feedback employed in one embodiment of the invention.

FIG. 5 shows an asynchronous pipeline with queues (Q12, Q23, Q34) between each processing stage (P1, P2, P3, P4) to hold the data produced by the previous stage before it's consumed by the next stage. In one embodiment of the invention, the various stages described herein are stages within the GPU 402. The latency of such a pipeline is the sum of the time the data spends being transformed in each stage (Tp1, Tp2, Tp3) plus the time the data spends sitting in each queue (Tq1, Tq2, Tq3).

The obvious first step to minimizing latency is to minimize the queues or even get rid of them entirely. One common way to do this is to synchronize the pipeline stages as per FIG. 6. Every stage operates simultaneously on different sets of data. When all stages are ready, they all pass their data to the next stage in the pipeline. Queuing becomes trivial and will no longer be shown in the figures. Latency of a synchronized pipeline is the number of stages times the time for the slowest stage to complete.

Figure 7:
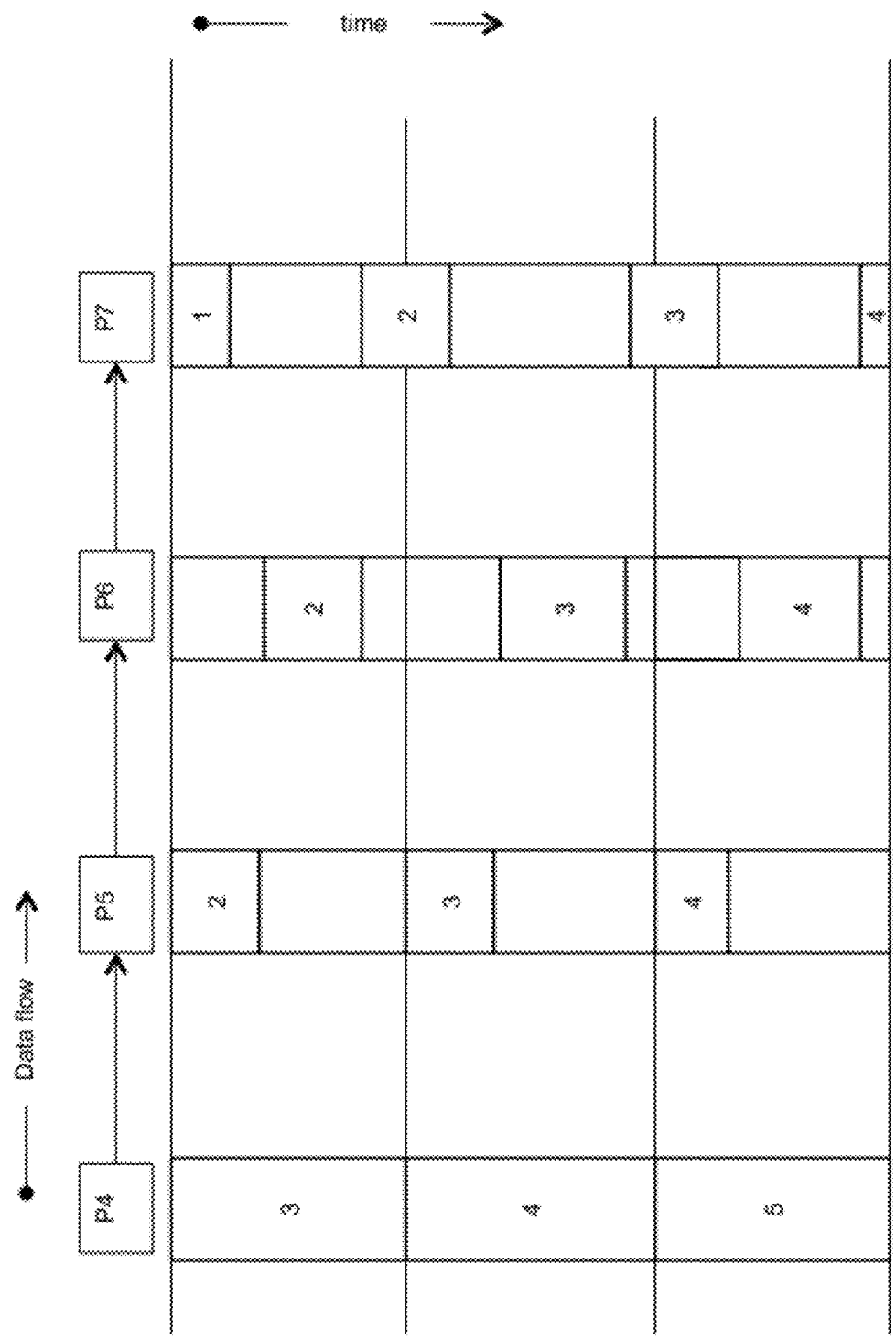

This slowest stage in the pipeline is the bottleneck, P4 in all figures. This stage is often a fixed feature of the device over which a designer has no control. FIG. 7 shows the dataflow downstream from the bottleneck stage. Notice there is no need for queuing or synchronization. Latency is the sum of the time it takes to complete each stage. Latency cannot be lower than this.

Figure 8:
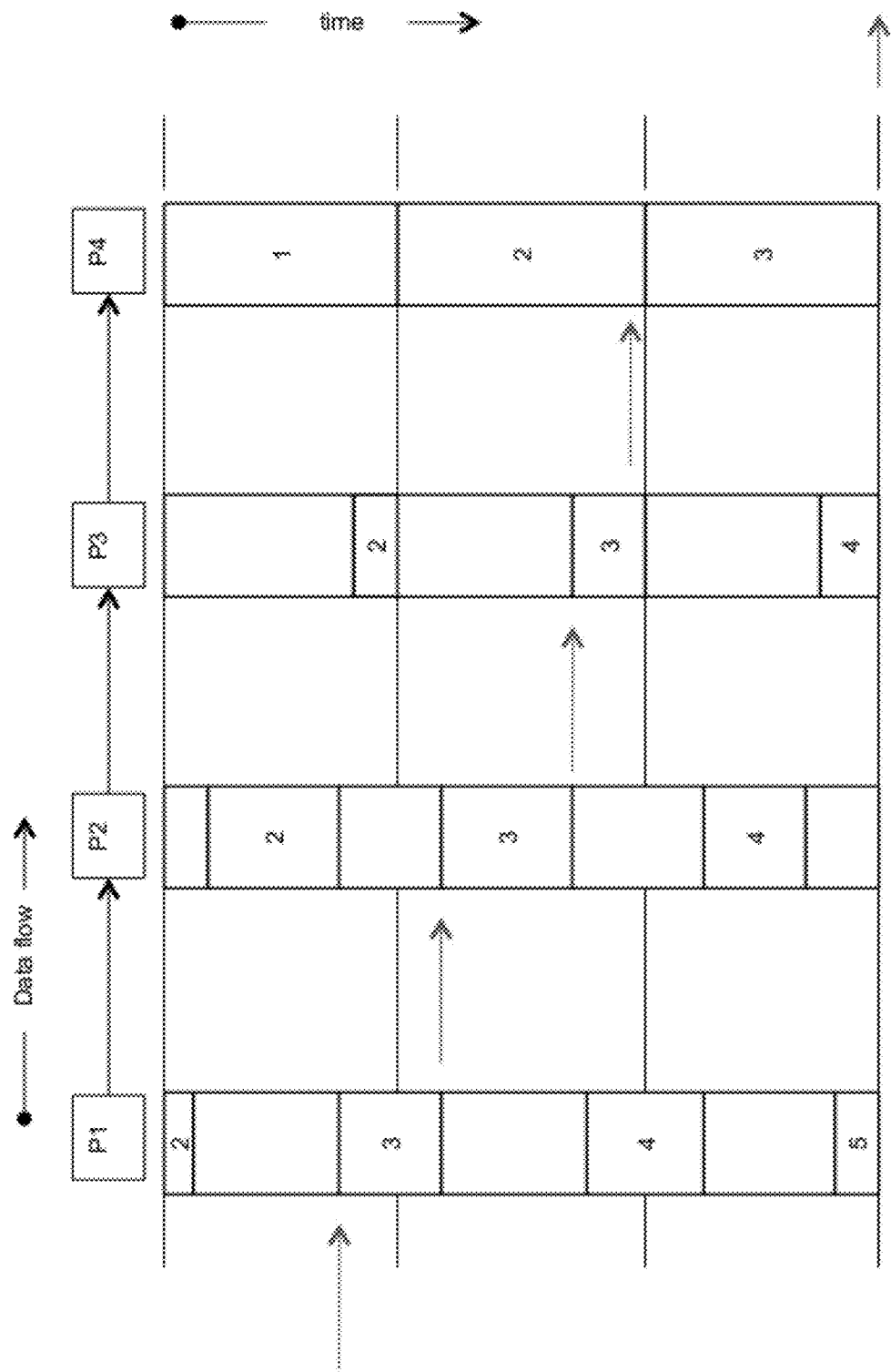

This inspires a method for minimizing the latency of pipeline stages upstream from the bottleneck as per FIG. 8. If the first pipeline stage knows exactly how long every pipeline stage will take and when the bottleneck stage will request new data, it can predict when to begin producing new data that will be ready just in time for the bottleneck stage. As such, in one embodiment, the first pipeline stage may throttle down its clock to slow down data processing based on when the new data will be needed by the bottleneck stage. This technique may be referred to as a phase locked pipeline. The total latency is the sum of the times for each pipeline stage.

Figure 9:
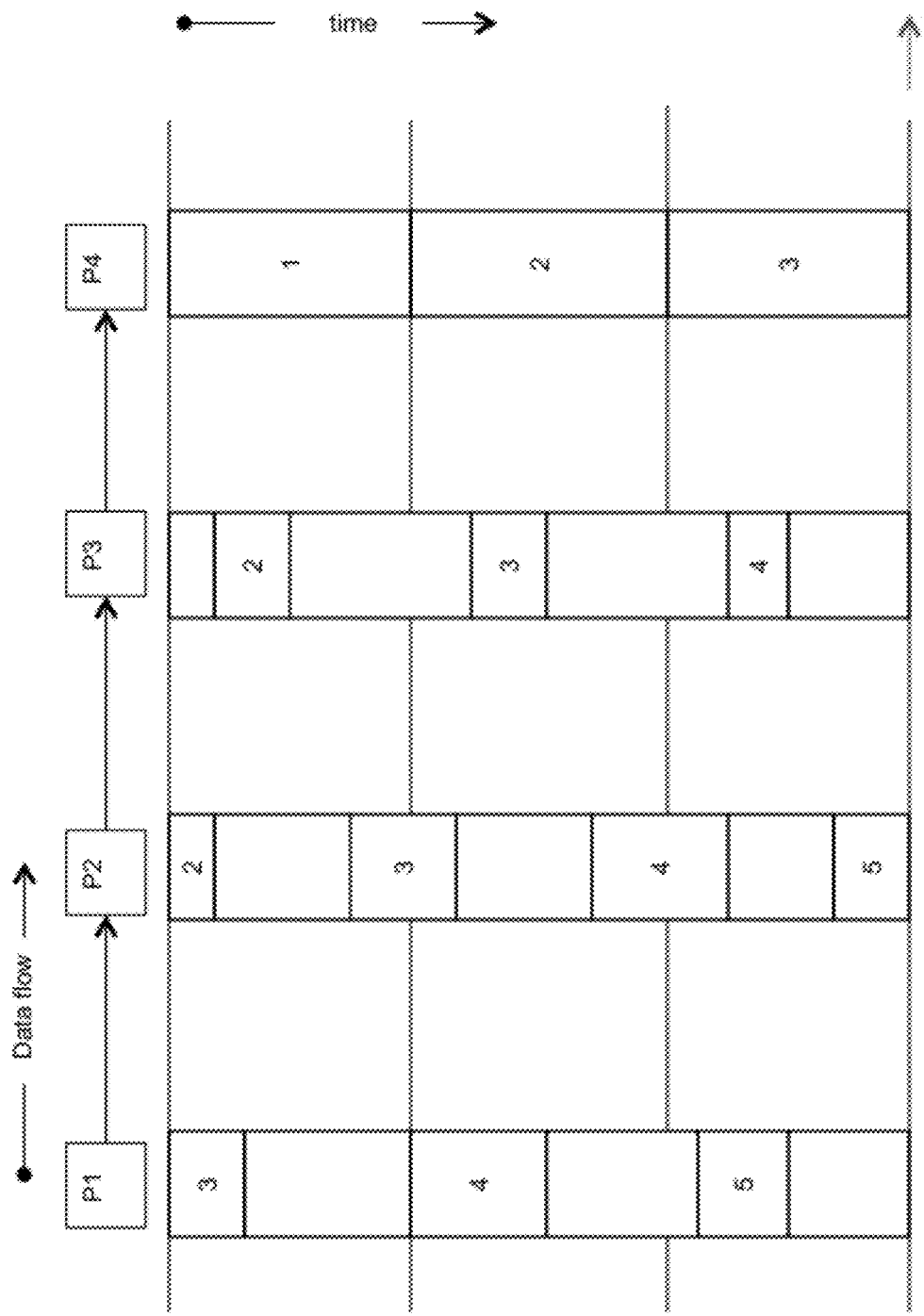

Another embodiment is illustrated in FIG. 9 in which the bottleneck stage is artificially moved to the first pipeline stage by slowing the first pipeline stage down to be slightly slower than the actual bottleneck stage. The box labeled 5 in P1 starts after box 3 in P4. Box 4 in P1 should also be slightly lower than the top of box 2 in P4. This is common practice in video games where the bottleneck stage is the physical connection between the computer and the monitor. One drawback in FIG. 9 is there must be some latency inducing queuing (not shown) between stages P3 and P4. Another drawback is that the latency experienced by the user may drift over time, decreasing steadily and then suddenly increasing only to begin decreasing again. It may also result in dropped frames. Developers often minimize dropped frames by driving the first stage at a rate as close to the bottleneck rate as possible. However, this rate is often not known exactly. If the first stage is driven even slightly faster than the bottleneck rate, the queues in the system will fill and stall the upstream stages. Ironically, attempting to minimize latency using this method risks maximizing it.

Figure 10:
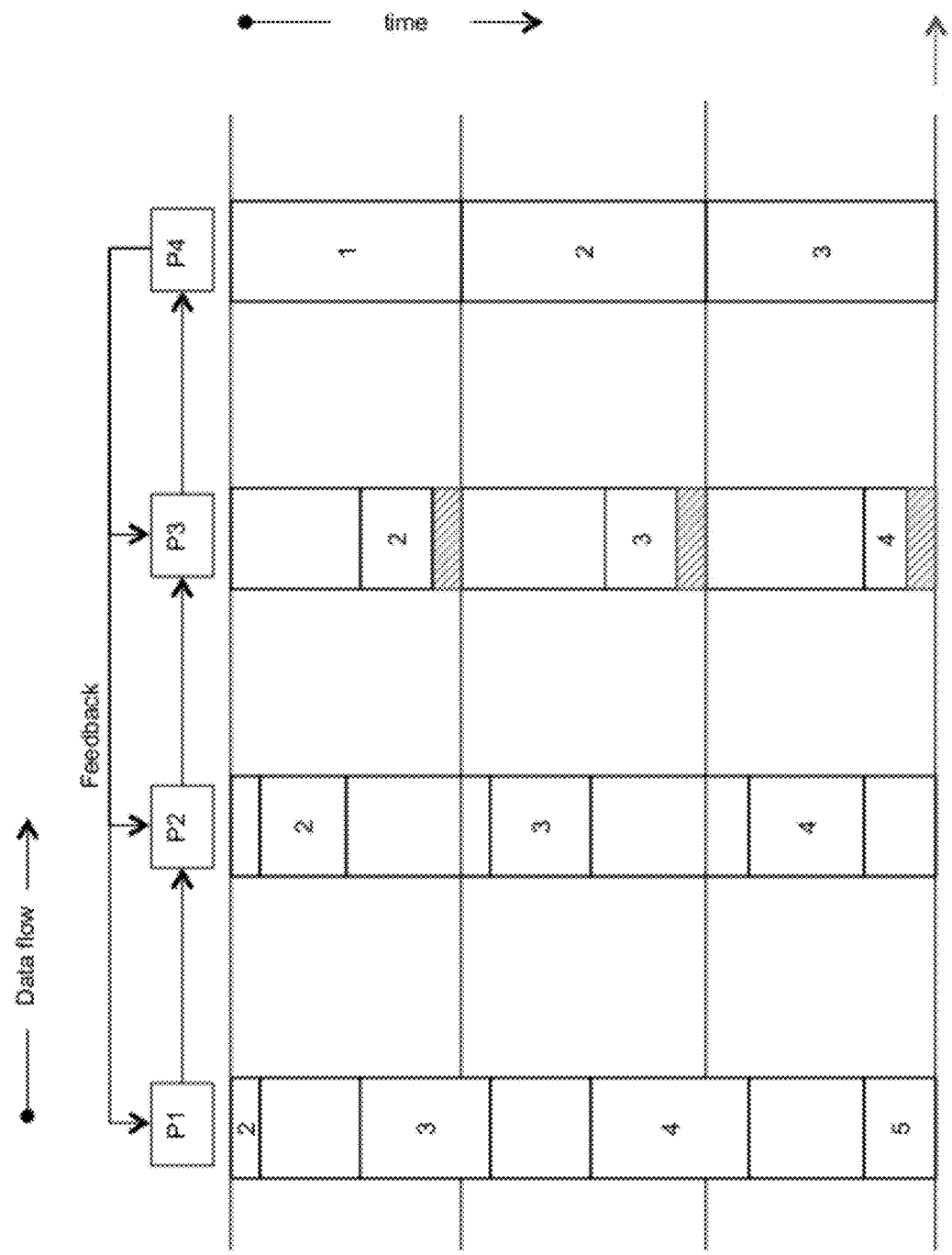

In one embodiment of the invention, shown in FIG. 10, the first stage is limited to be the same rate as the bottleneck stage. The tops of the numbered boxes in P1 should be the distance apart as the tops of the boxes in P4. The rates at which P1 is producing frames exactly matches the rate at which P4 is consuming them. Feedback is necessarily provided from the bottleneck stage to the first stage to ensure the rates match exactly. Every stage provides feedback including but not limited to the time required to operate on the data and time spent queued. The phase locking component maintains statistical information on each stage and can accurately predict with a predetermined confidence level that the data will be ready when the bottleneck stage requires it with a minimum amount of queuing. Note that a universal clock is not necessary in this embodiment. The phase locking component only requires relative times. As such, the pipeline stages may use different clocks. In fact, the clocks may be in separate physical devices that could potentially be thousands of miles apart. In summary, in this embodiment of the invention, a bottleneck phase is identified based on timing constraints. Feedback is then provided to upstream stages from the bottleneck phase to allow the upstream stages to match the bottleneck stage rate precisely. The phase of the upstream stages is adjusted to minimize time wasted in queues.

Figure 11:
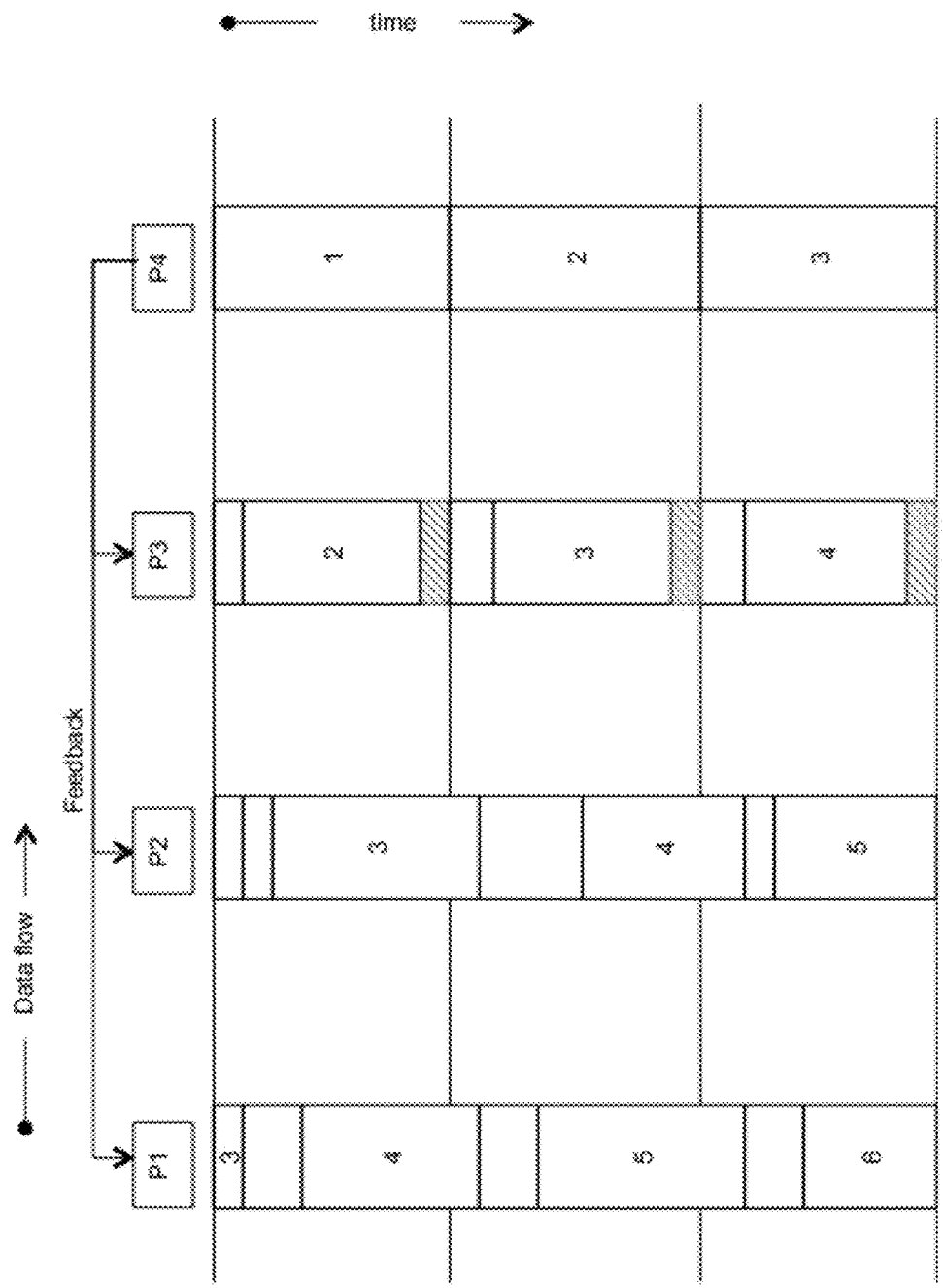

The preceding figures illustrated lightweight applications. These are inefficient because the hardware sits around idle most of the time. One embodiment of the invention which forms a less expensive design is one which dedicates the minimum hardware resources to each stage but still guarantees that each stage is faster than the bottleneck stage, as illustrated in FIG. 11. In this case, the phase locking method gains very little over a fully synchronized pipeline as per FIG. 6. Another example is computer games that render more polygons with higher resolution textures, more anti-aliasing, special effects until the frame rate starts to drop.

Figure 12:
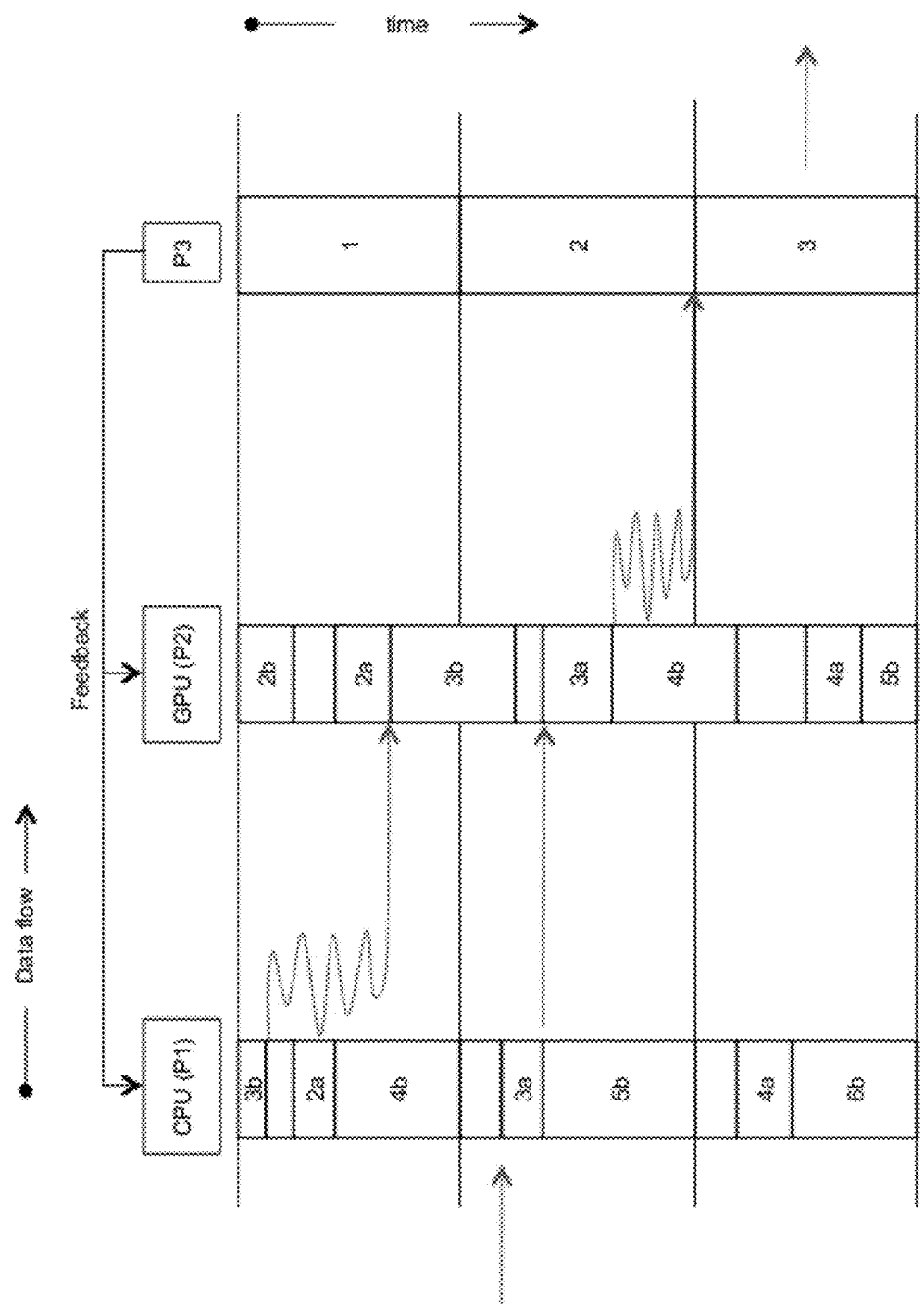

This embodiment leads directly to another embodiment of the invention in which advanced graphics is implemented using minimal hardware, but with low latency. In this embodiment, the video stream is subdivided into two logical parts which may be processed independently: (a) a resource light, latency critical part, and (b) a resource heavy, latency tolerant part. These two parts can be combined in a hybrid system as illustrated in FIG. 12. One specific example (of many possible) would be a computer game known as a "first person shooter" in which a user navigates around from the perspective of a game character in a 3-dimensional world. With this type of game, rendering the background and non-player characters is resource heavy and latency tolerant, denoted in FIG. 12 with a "b" for "background," while rendering the image of the player's character is made resource light and latency-intolerant (i.e., because anything less than very low latency performance will result in an undesirable user experience), denoted in FIG. 12 with an "a" for "avatar." When the user pulls the trigger, he expects to see his weapon to fire immediately. In the specific embodiment illustrated, the game is implemented on a personal computer with a central processing unit (CPU) as stage P1 and a graphics processing unit (GPU) as stage P2. The monitor, represented as P3, is the bottleneck stage. "Monitor," in the case, means any device that consumes the uncompressed video stream. Which could be the compressing hardware.

Figure 6:
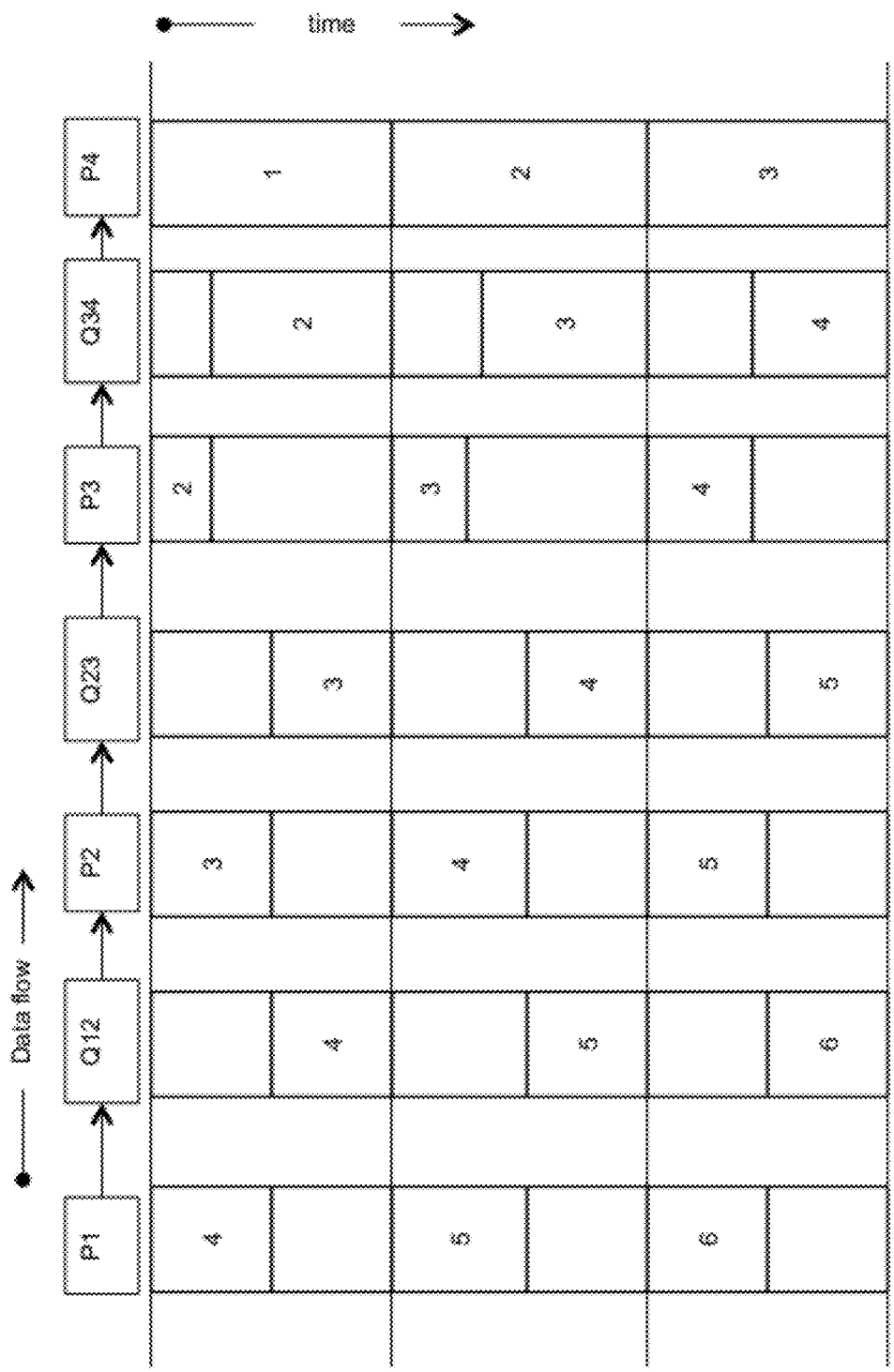

In this embodiment, the CPU completes its work on the background image, represented by 3b, before completing its work on avatar image, represented by 2a. Nonetheless, to reduce latency associated with the avatar, the GPU processes 2a ahead of 3b, rendering the avatar 2a on a previously rendered background 2b (to render the motion of the avatar as efficiently as possible) outputs that frame, and then immediately begins rendering the background of the next frame, represented by 3b. The GPU may sit idle for a short time waiting for data from the CPU to complete the next frame. In this embodiment, the CPU sits idle waiting for the phase lock to signal that it's time to make a list of drawing commands for the user's avatar and pass it on to the GPU. The CPU then immediately begins to draw the background of a new frame but it can't be the next frame because the GPU will start drawing the next frame. There's no way the CPU will have the next frame ready in time. Therefore, the CPU must start drawing the background for the frame after the next. This situation is similar to the operation of a synchronized pipeline as illustrated in FIG. 6.

Figure 13:
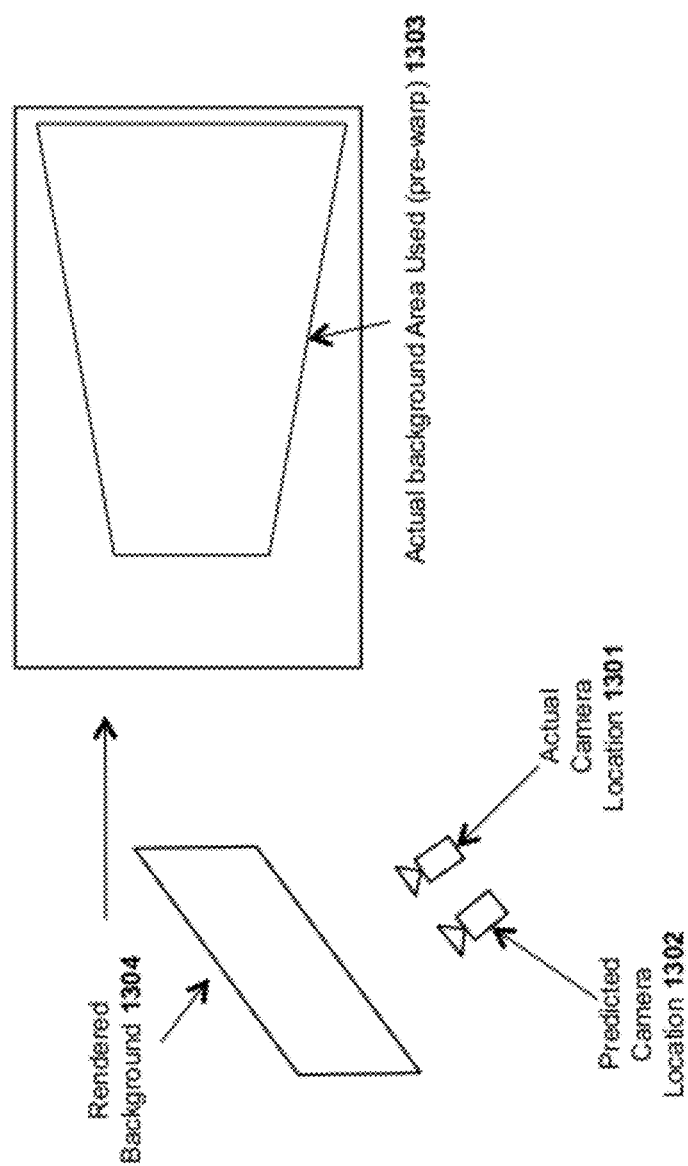
FIG. 13 illustrates distinctions between a predicted camera location and an actual camera location.

This one frame phase difference between the avatar and the background is, in most cases, acceptable to the user. However, in cases where highest possible quality is desired, the following additional techniques may be employed. The high latency path predicts the inputs to generate the data. In the first person shooter example, the location of the camera is predicted ahead of time. When the output of the high and low latency paths are combined, the output of the high latency path (e.g., the background) is modified to more closely match what would have been generated using the actual inputs instead of the predicted inputs. In the first person shooter example, the background would be translated, scaled, and/or rotated in order to match the actual camera position. Note this implies the high latency path would have to render an area somewhat larger than what is actually viewed by the player as illustrated in FIG. 13, which shows an actual camera location 1301, a predicted camera location 1302, an actual background 1303 and a rendered background 1304. Thus, if a user is playing a game in which a character is running at a tree, every frame the tree gets a little closer, meaning bigger. The user shoots a gun which hits the tree. In the hybrid scenario the tree is lagging behind the shot by one frame. So things might look "wrong" for a frame (i.e., the shot will look like it missed). To compensate, the described embodiments of the invention enlarge the tree to approximate what it would look like in the frame in which the shot was fired.

As another example, when a user is playing a first person shooter video game and pushes the fire button, the user wants to immediately see flames coming out of the gun. Thus, in one embodiment, the program draws the firing gun on top of a previously rendered background and the game times it so that the frame is done just in time to be picked up by the next stage in the pipeline (which is the dvi output (vsync) or the encoder input or some other bottleneck). Then the game draws its best guess at what the background should be for the next frame. If the guess is poor, then one embodiment modifies the background to more closely match what it would have been if the it had been rendered from the correct camera position. Thus, the technique shown in FIG. 13 is a simple affine warp. More sophisticated techniques employed in other embodiments use the z-buffer to do a better job.

In one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, the modules may be implemented on a programmable digital signal processor ("DSP") such as a Texas Instruments' TMS320x architecture (e.g., a TMS320C6000, TMS320C5000, . . . etc). Various different DSPs may be used while still complying with these underlying principles.

Embodiments may include various steps as set forth above. The steps may be embodied in machine-executable instructions which cause a general-purpose or special-purpose processor to perform certain steps. Various elements which are not relevant to these underlying principles such as computer memory, hard drive, input devices, have been left out of some or all of the figures to avoid obscuring the pertinent aspects.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

What is claimed is:

1. A computer implemented method for efficiently processing a video stream with a processor pipeline having a plurality of pipeline stages, comprising:
   identifying a bottleneck stage within the processor pipeline, the bottleneck stage having a first clock and processing frames of the video stream;
   receiving a feedback signal from the bottleneck stage at one or more upstream stages, at least one of the upstream stages having a second clock, the feedback signal including information as to time required by the bottleneck stage to operate on data and information as to time the data spent queued; and
   responsively adjusting the speed at which the one or more upstream stages are processing frames of the video stream to approximate the speed at which the bottleneck stage is processing the frames of the video stream, wherein the speed is adjusted, at least in part, by modifying a frequency of the second clock.

2. The method as in claim 1 wherein the processor pipeline includes one or more stages within a central processor unit (CPU) and one or more stages within a graphics processing unit (GPU).

3. The method as in claim 1 wherein the video stream is generated by program code of a video game being played by a user.

4. The method as in claim 3 wherein the video game is executed on a hosting server, wherein the user plays the video game from a client computer, and wherein the pipeline stages are stages within the hosting server.

5. A method, comprising operations of:
   identifying a bottleneck stage within a processor pipeline with a plurality of pipeline stages, wherein the bottleneck stage has a first clock and processes frames of a video stream;
   receiving a feedback signal from the bottleneck stage at one or more upstream stages, wherein at least one of the upstream stages has a second clock and wherein the feedback signal includes information as to time required by the bottleneck stage to operate on data and information as to time the data spent queued; and
   responsively adjusting the speed at which the one or more upstream stages are processing frames of the video stream to approximate the speed at which the bottleneck stage is processing the frames of the video stream, wherein the speed is adjusted, at least in part, by modifying a frequency of the second clock, and wherein each of the operations is performed by hardware components that contain hardwired logic.

6. The method as in claim 1, wherein the processor pipeline includes one or more stages within a central processor unit (CPU) and one or more stages within a graphics processing unit (GPU).

7. The method as in claim 1, wherein the video stream is generated by program code of a video game being played by a user.

8. The method as in claim 7, wherein the video game is executed on a hosting server, wherein the user plays the video game from a client computer, and wherein the pipeline stages are stages within the hosting server.

* * * * *